(12) United States Patent
Liu

(10) Patent No.: US 8,477,769 B2
(45) Date of Patent: Jul. 2, 2013

(54) FLEXIBLE SHARED MESH PROTECTION SERVICES FOR INTELLIGENT TDM-BASED OPTICAL TRANSPORT NETWORKS

(75) Inventor: Stephen Shyan-Shiang Liu, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 835 days.

(21) Appl. No.: 12/119,818

(22) Filed: May 13, 2008

(65) Prior Publication Data
US 2009/0285574 A1 Nov. 19, 2009

(51) Int. Cl.
*H04L 12/50* (2006.01)
*H04Q 11/00* (2006.01)

(52) U.S. Cl.
USPC ............... 370/388; 398/5; 398/709; 398/239

(58) Field of Classification Search
None
See application file for complete search history.

(56) References Cited

U.S. PATENT DOCUMENTS

| | | | |
|---|---|---|---|
| 6,848,006 B1* | 1/2005 | Hermann | 709/239 |
| 2003/0063560 A1* | 4/2003 | Jenq et al. | 370/216 |
| 2007/0201380 A1* | 8/2007 | Ma et al. | 370/254 |
| 2008/0170857 A1* | 7/2008 | Bardalai | 398/59 |
| 2008/0259914 A1* | 10/2008 | Simper et al. | 370/388 |

OTHER PUBLICATIONS

Guangzhi Li et al., "Efficient Distributed Restoration Path Selection for Shared Mesh Restoration", IEEE/ACM Transactions on Networking, vol. 11, No. 5, Oct. 2003, pp. 761-771.

Timothy Y. Chow et al., "Fast Optical Layer Mesh Protection Using Pre-Cross-Connected Trails", IEEE/ACM Transactions on Networking, vol. 12, No. 3, Jun. 2004, pp. 539-548.

Bharat T. Doshi et al., "Reliability and Capacity Efficiency of Restoration Strategies for Telecommunication Networks", Design of Reliable Communication Networks (DRCN) 2003, Banff, Alberta, Canada, Oct. 19-22, 2003, pp. 440-447.

* cited by examiner

*Primary Examiner* — Andrew Lai
*Assistant Examiner* — Leon Andrews

(57) ABSTRACT

A system includes one or more active/working circuit groups to transfer information through a protection domain, the protection domain defined by a plurality of network devices and a plurality of links connecting the network devices between a start point and an end point; and a protection circuit group through the protection domain, the protection circuit group being disjoint from the one or more active/working circuit groups to provide shared protection for the one or more active/working circuit groups, where the protection circuit group is comprised of an individual protection circuit and where a capacity of the protection circuit group is dynamically adjusted based on a capacity of the one or more active/working circuit groups.

20 Claims, 22 Drawing Sheets

400

BN: Border Node

••••••• Working path

━ ━ ━ Protection path

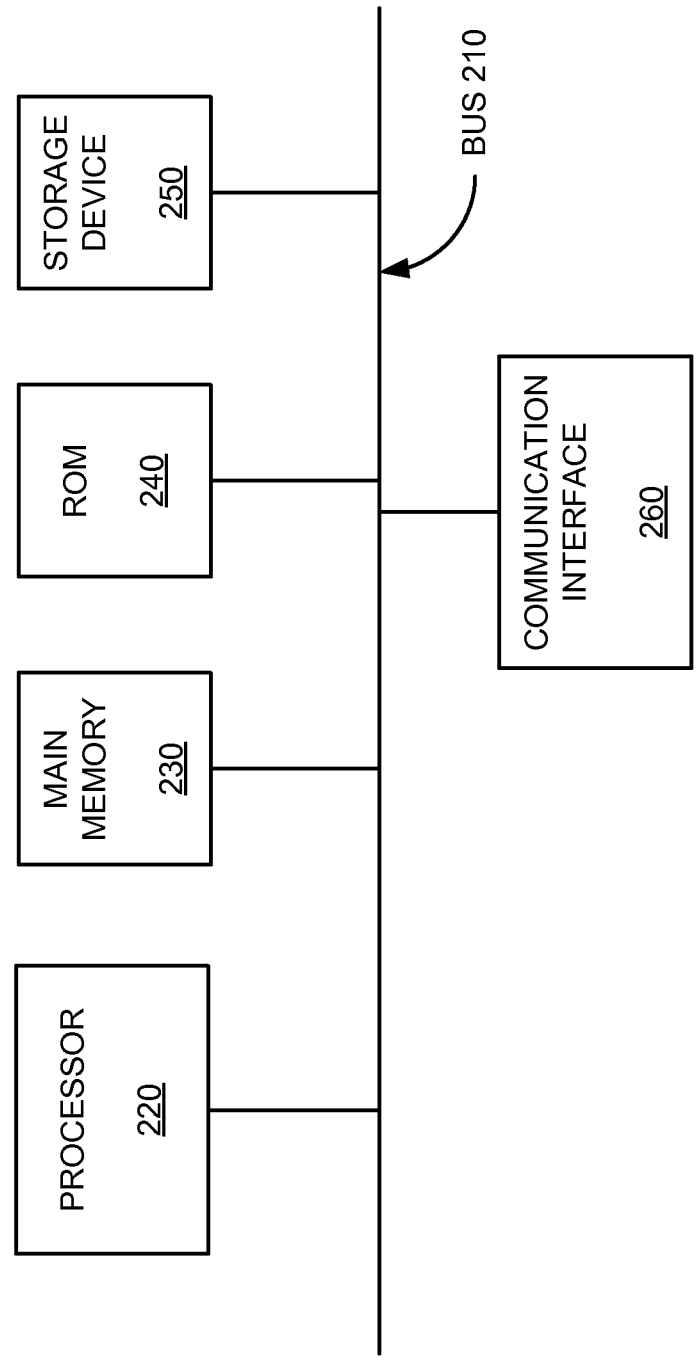

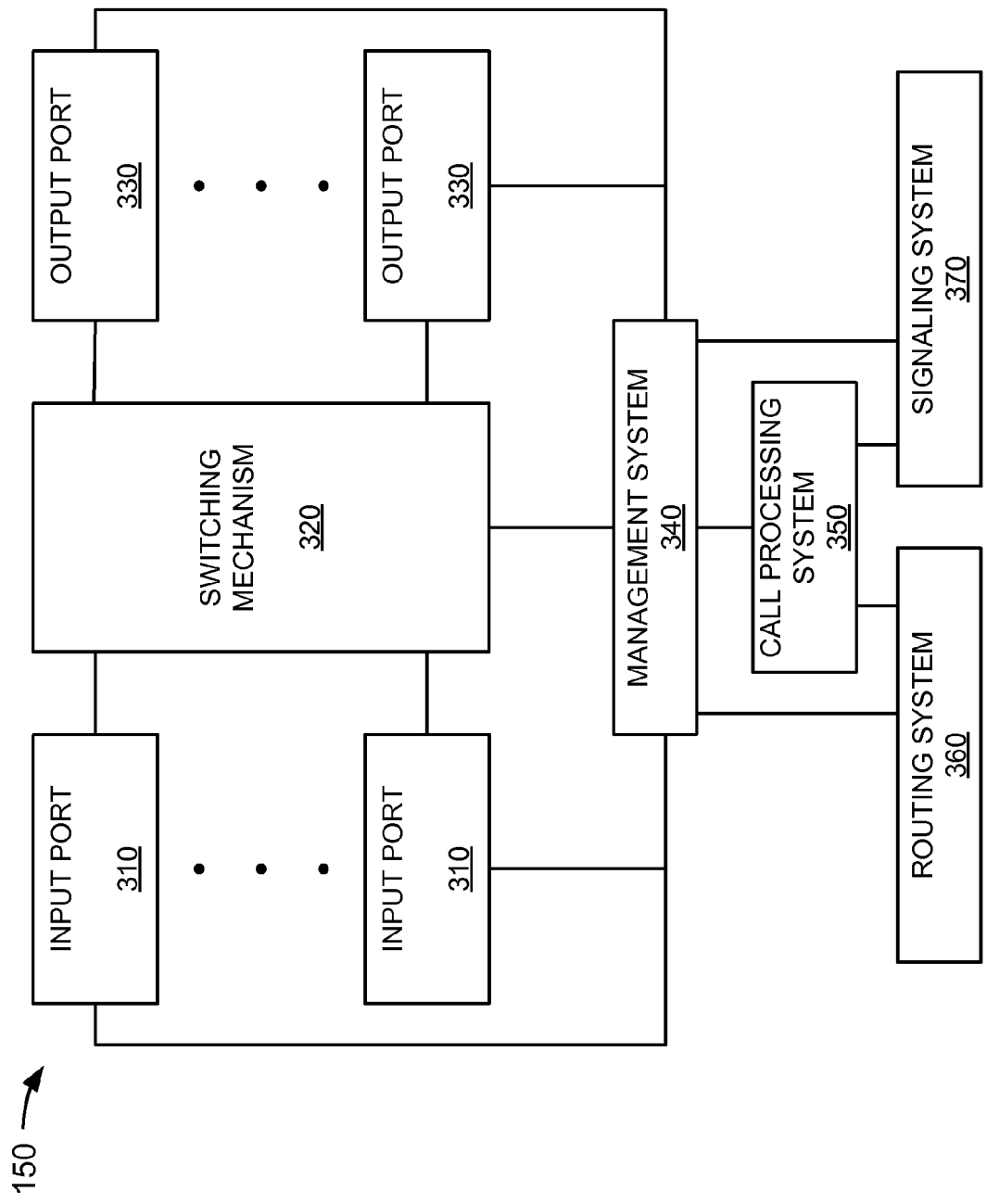

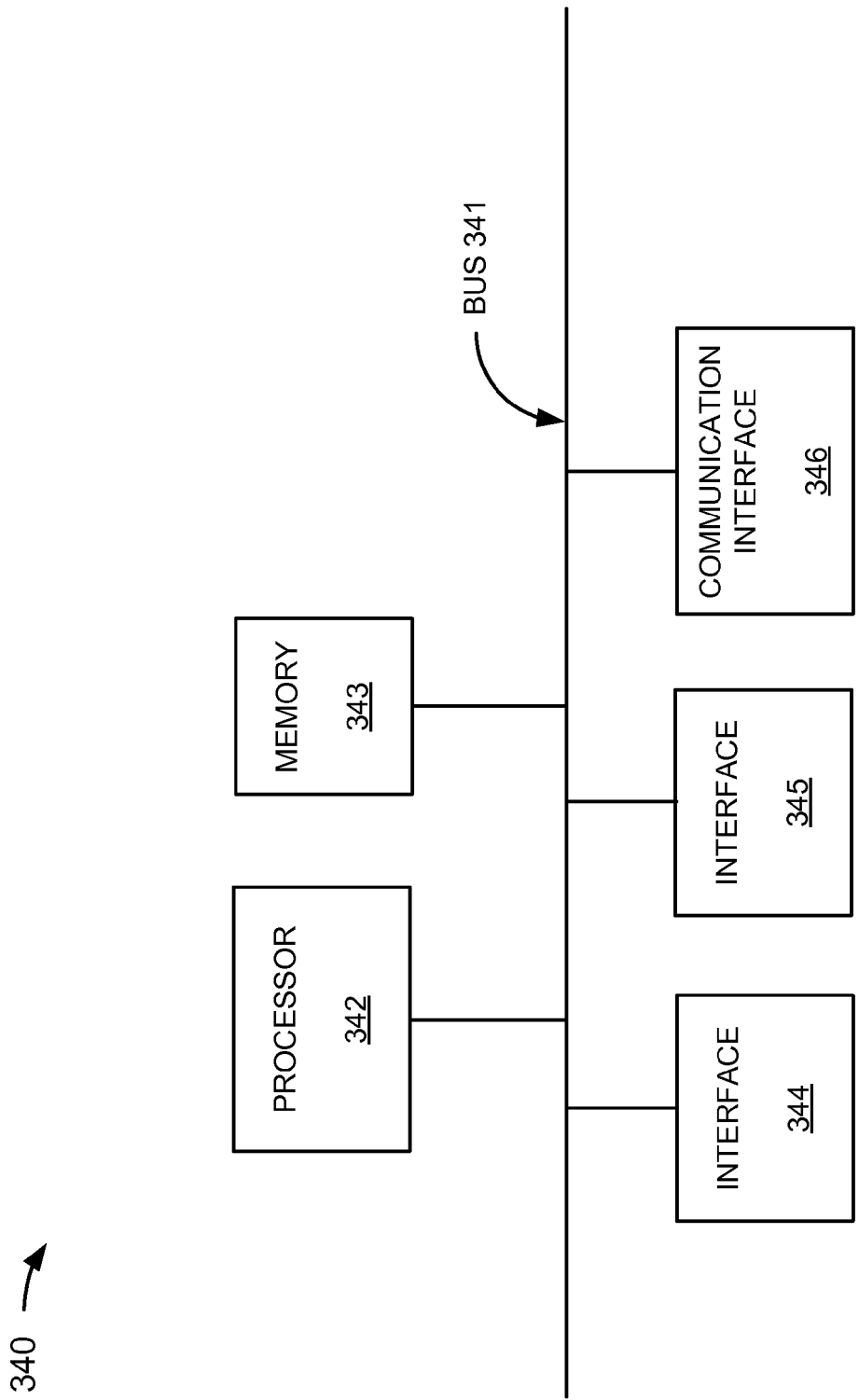

610 ⟶

| PCG Table(PCGT) | | | | | | |
|---|---|---|---|---|---|---|
| Protection SRLGs | Working path: 100, 102, 104, 106, ....<br>Protection path: 101, 103, 105, 107. ..... | | | | | |
| Circuit IDs | Total BW | Available BW for Protection (ABP) | Ckt Type | Protection Type | Status (Normal, Being Re paired, or Degraded) | SRLGs (Working & Protection SRLGs) |
| Protection CKT A | 36 STS1s | 20 STS1s | Three STS12c | 1+1 | | |
| Protection CKT B | 12 STS1s | 12 STS1s | STS12c | 1+1 | | |
| | | | | | | |
| | | | | | | |
| Total BW-P | 48 STS1s | | | | | |
| Total Available Protection BW (TAPB) | | 32 STS1s | | | | |

| PCG Protection Table (PPT) | | | | | | |
|---|---|---|---|---|---|---|
| Protection SRLGs | Working path: 100, 102, 104, 106, ....<br>Protection path: 101, 103, 105, 107, ..... | | | | | |
| Restored CKT | | Prot. CKT No. | BW | Type | Time Slots | Original ACG ID | Original SRLG |
| Ckt IDs | Status (IS or OOS) | | | | | | |
| Ckt X | IS | A | 3 STS1s | STS3c | 1-3 | 1 | 2, 23, 45, 64 |
| Ckt Y | IS | A | STS1 | STS1 | 4 | 1 | 2, 23, 45, 64 |
| Ckt Z | IS | A | 12 STS1s | STS12c | 7-18 | 2 | 10, 79, 84, 98 |
| | | | | | | | |
| Total Restored BW | | | 16 STS1s | | | | |

| ACG No.1 | | | | | |
|---|---|---|---|---|---|
| Base SRLGs | 2, 23, 45, 64 | | | | |
| Circuit IDs | BW | Type | SRLG | Status (Normal or Failed, pending restoration) | |
| Ckt 1 | 3 STS1s | STS3c | 23, 45, 64, 2 | | |
| Ckt 2 | 1 STS1 | STS1 | 23, 45, 64, 2 | | |
| Ckt 3 | 12 STS1s | STS12c | 23, 45, 78, 10 | | |
| | | | | | |
| Total BW: | 16 STS1s | | | | |
| Protection BW Ratio (PBR) | 33% | | | | |

| ACG No.2 | | | | | |
|---|---|---|---|---|---|
| Base SRLGs | 10, 79, 84, 98 | | | | |
| Circuit IDs | BW | Type | SRLG | Status (Normal or Failed, pending restoration) | |
| Ckt 5 | 1 STS1 | STS1 | 10, 79, 84, 98 | | |
| Ckt 6 | 1 STS1 | STS1 | 10, 79, 84, 98 | | |
| Ckt 3 | 12 STS1s | STS12c | 23, 45, 78, 10 | | |
| | | | | | |
| Total BW: | 14 STS1s | | | | |
| Protection BW Ratio (PBR) | 29% | | | | |

FIG. 7B

FLEXIBLE SHARED MESH PROTECTION SERVICES FOR INTELLIGENT TDM-BASED OPTICAL TRANSPORT NETWORKS

BACKGROUND INFORMATION

Service providers are migrating their Layer 0 (wavelength-division multiplexing management or WDM) and Layer 1 (time-division multiplexing or TDM) core networks into integrated intelligent optical transport networks (IOTNs). In some cases, previous network management system (NMS)-based procedures are being phased out by the deployment of an intelligent control plane in the IOTNs. IOTNs may support mesh topology to achieve better resource utilization and may support a distributed control plane to fully automate networking functions, such as network topology discovery, network resource discovery, end-to-end path calculation, end-to-end path provisioning and activation, and protection & restoration (P&R). The IOTN control plane and mesh topology together have provided opportunities for service providers to develop advanced optical transport network (OTN) services that are better tailored to the business needs of wholesale and enterprise customers.

BRIEF DESCRIPTION OF THE DRAWINGS

FIG. 2 depicts an exemplary network management system device for the exemplary network illustrated in FIG. 1;

FIG. 3A depicts an exemplary network device configured to communicate via the exemplary network illustrated in FIG. 1;

FIG. 3B is a diagram of a management system of the exemplary network device illustrated in FIG. 3A;

FIGS. 6A-B are exemplary data tables for protection circuit groups;

FIGS. 7A-B are exemplary data tables for active circuit groups;

DETAILED DESCRIPTION OF PREFERRED EMBODIMENTS

Figure 1:
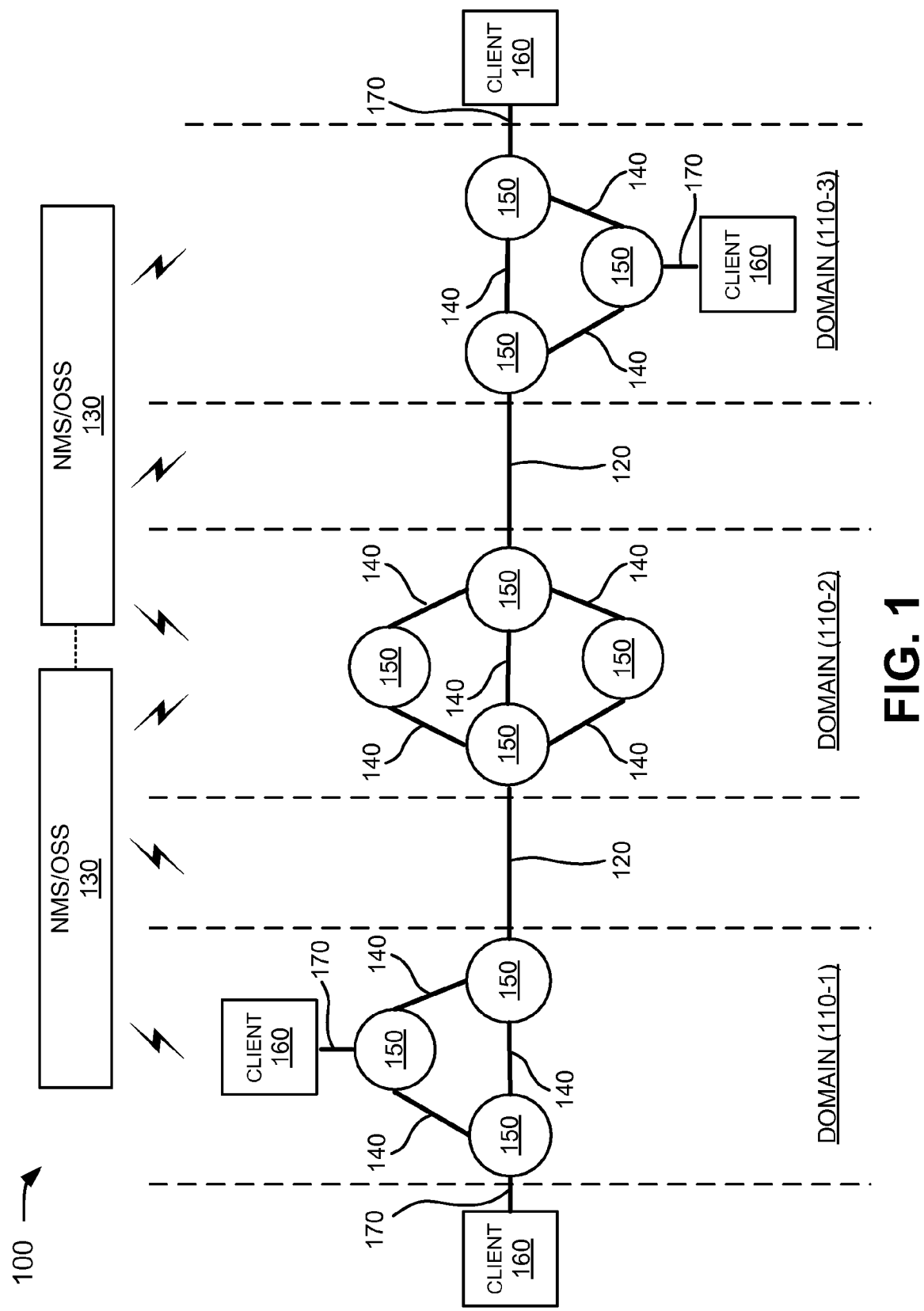
FIG. 1 depicts an exemplary network in which systems and methods described herein may be implemented.

The following detailed description refers to the accompanying drawings. The same reference numbers in different drawings may identify the same or similar elements. Also, the following detailed description does not limit the invention.

Automated data plane routing and signaling functions by network equipment may permit a network to direct a flow of information streams or traffic along a particular path (e.g., a label switched path) across the network. An "information stream" may include any type or form of data stream, such as packet or non-packet data streams. A user may specify the start point, end point, and bandwidth (BW) required, and a routing agent may allocate the path through the network, may provision the traffic path, may set up cross-connects, and may allocate bandwidth from the paths for a user-requested service. The actual path that the traffic may take through the network may not be specified by the user.

As defined by international standards bodies, a control plane architecture framework may be defined by three network interfaces: an external-network network interface (E-NNI), an internal-network network interface (I-NNI), and/or a User Network Interface (UNI). An E-NNI may provide a demarcation point that supports cross-domain connection provisioning (e.g., intra-carrier/inter-domain (trusted) connections and/or inter-carrier (un-trusted) connections), and may provide signaling with limited routing information exchanges. An I-NNI may provide an intra-domain (trusted) node-to-node interface that supports control plane functions, and may provide intra-domain signaling and/or routing functions. A UNI may provide a demarcation point between users and a network, may be an un-trusted interface, and may provide signaling capabilities to the users.

An intelligent control plane may support auto-discovery and/or self-inventory of network resources, topology, connection map, etc. An intelligent control plane may also support end-to-end path calculations, dynamic end-to-end path setup and teardowns in a single-step and/or single-ended fashion, and/or a variety of protection and/or restoration schemes. An intelligent control plane may provide several benefits, including improved network efficiency, enhanced network resiliency, new revenue opportunities, etc.

Systems and methods disclosed herein may provide a mechanism for and class of flexible shared mesh protection (FSMP) services. The FSMP mechanism may use the dynamic provisioning capability of an optical control plane and SONET/SDH adaptive-rate port technologies. The FSMP mechanism can transform shared mesh technology into a service-ready technology platform, upon which advanced shared mesh protection services can be offered. The flexible shared mesh protection service (FSMPS) may use a minimal amount of protection capacity to support circuit restorations; thus FSMPS may provide a cost savings to service providers.

The systems and methods described herein may be applied to various control plane interfaces (e.g., an I-NNI or E-NNI) for TDM-based OTNs, and thus, may provide a mechanism to manage shared protection bandwidth on core networking layers (e.g., "Layer 1" (TDM)). The systems and methods may also permit dynamic adjustment of shared protection capacity by the control plane.

FIG. 1 depicts an exemplary network 100 in which systems and methods described herein may be implemented. Network 100 may include multiple I-NNI domains 110-1, 110-2 and 110-3 (collectively referred to as either "I-NNI domains 110 or control plane (CP) domains 110"), multiple E-NNIs 120 interconnecting the CP domains 110, and one or more network management system/operations support system (NMS/OSS) 130. Each of CP domains 110 may include multiple I-NNI links 140 and multiple network devices 150. Additionally, clients 160 may be linked to various network devices 150 via UNI links 170. In FIG. 1, three CP domains 110, two E-NNI interfaces 120, two NMS/OSS 130, eleven I-NNI links 140, ten network devices 150, four clients 160, and four UNI links 170 have been illustrated for simplicity. In practice, there may be more or fewer domains, E-NNI links, control planes, I-NNI links, network devices, clients, and/or UNI links.

CP domains 110 may include local area networks (LANs), wide area networks (WANs), metropolitan area networks (MANs), telephone networks (e.g., the Public Switched Telephone Network (PSTN)), intranets, or a combination of networks. In one implementation, for example, CP domains 110 may include Next Generation Transfer Networks (NG-TNs), such as Next Generation Optical Transfer Networks (NG-OTNs). In certain implementations, clients 160, network devices 150, and/or NMS/OSS 130 may interconnect and/or connect to CP domains 110 via wired and/or wireless connections.

E-NNI 120 may include physical media that interconnects CP domains 110. In one implementation, E-NNI 120 may support multiple E-NNI links capable of supporting cross-domain connection provisioning (e.g., intra-carrier/inter-domain (trusted) connections and/or inter-carrier (un-trusted) connections), and/or capable of providing cross-domain signaling and routing. E-NNI 120 may include links that physically connect to ports (e.g., input ports or output ports) provided on network devices 150, and may be configured by provisioning software provided in management systems of network devices 150.

NMS/OSS 130 may include a device (e.g., a server), or group of devices, capable of supporting one or more control planes in an IOTN that provides design and/or routing of end-to-end circuits (or circuits within a domain) and dynamic provisioning of protection for those circuits. Additional details of NMS/OSS 130 are provided below in connection with FIG. 2.

I-NNI links 140 may include a physical media that interconnects adjacent network devices 150. For example, I-NNI links 140 may provide a path that permits communication among network devices 150. In one implementation, for example, network links 140 may support I-NNIs capable of providing intra-domain (trusted) node-to-node interfaces that support control plane functions, and/or capable of providing intra-domain signaling and/or routing functions. Similar to E-NNI links described above, I-NNI links 140 may physically connect to ports (e.g., input ports or output ports) provided on network devices 150, and may be configured by provisioning software provided in management systems of network devices 150.

Each network device 150 may include a device, such as a multiplexer, a router (e.g., a Layer 3 router), a switch (e.g., a Layer 2 switch), an optical cross connect (OCX), a hub, a bridge, a reconfigurable optical add and drop multiplexer (ROADM), a dense wavelength division multiplexer (DWDM) (e.g., a Layer 0 DWDM), or another type of computation or communication device capable of running on any layer. Additional details of network devices 150 are provided below in connection with FIGS. 3A-3C.

Clients 160 may include client entities. An entity may be defined as a device, such as a personal computer, a telephone (e.g., wired, wireless, SIP, etc.), a personal digital assistant (PDA), a television, a laptop, or another type of computation or communication device, a thread or process running on one of these devices, and/or an object executable by one of these devices. Clients 160 may connect to network devices 150, may function as endpoints for network 100, and/or may use services provided by network 100. Each client 160 may be connected to a network device 150 via a UNI link 170.

In an exemplary implementation, network 100 may be an IOTN including an intelligent control plane (e.g., supported by NMS/OSS 130). The network topology can be a mesh that supports at least two-degree route diversity between a pair of end-points. Diversity can be measured, for example, in terms of shared risk link group (SRLG) diversity, where K-degree diversity means there exists K fully SRLG diverse routes available between the end-points of interest. Network 100 may be operated with an optical-TDM control plane. All control-plane-managed TDM ports may support an adaptive-rate (or auto-concatenation) feature, which allows a protection circuit to automatically adjust its payload structures to the structure of restored customer circuits. A protection circuit may serve as a backup for one or more customer circuits in the event of a failure within the network. The control plane may provide explicit route support. For example, the control plane routing can route a customer circuit according to an operator-selected route. The control plane may support shared risk link group (SRLG) diversity. SRLG values can be assigned to essentially any network resources (e.g., fiber cables, central offices, network switches/nodes, conduits, WDM amplifier chains, circuit packs, etc.) through which the control plane provisions customer circuits. Any fault on these network resources can cause interruptions to customer services. The control plane can be capable of provisioning circuits/services according to customer SRLG diversity requirements. The control plane may also support SRLG retrieval for established customer and protection circuits.

Although FIG. 1 shows exemplary components of network 100, in other implementations, network 100 may contain fewer or additional components that may provide a FSMP mechanism for control plane enabled networks that perform end-to-end path routing. In still other implementations, one or more components of network 100 may perform the tasks performed by other components of network 100. The systems and methods described herein may be used for any device that supports control plane enabled networks using TDM-based OTN routing protocols to perform circuit path routing.

FIG. 2 is an exemplary diagram of a device which may correspond to NMS/OSS 130. As shown, NMS/OSS 130 may include a bus 210, a processor 220, a main memory 230, a read only memory (ROM) 240, a storage device 250, and a communication interface 260. Bus 210 may include a path that permits communication among the components of NMS/OSS 130.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Communication interface 260 may include any transceiver-like mechanism that enables NMS/OSS 130 to communicate with network devices and/or systems. For example, communication interface 260 may include mechanisms for communicating with network devices and/or systems via a network, such as network 100.

As will be described in detail below, NMS/OSS 130 may perform certain routing operations. NMS/OSS 130 may perform these operations in response to processor 220 executing software instructions contained in a computer-readable medium, such as memory 230. A computer-readable medium may be defined as a physical or logical memory device.

The software execution may be directly or indirectly triggered by network events and/or network operator inputs. The software instructions may be read into memory 230 from another computer-readable medium, such as data storage device 250, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of NMS/OSS 130, in other implementations, NMS/OSS 130 may contain fewer or additional components that may provide a FSMP mechanism for control plane enabled networks. In still other implementations, one or more components of NMS/OSS 130 may perform the tasks performed by other components of NMS/OSS 130.

FIG. 3A is an exemplary diagram of a device that may correspond to one of network devices 150. The device may include input ports 310, a switching mechanism 320, output ports 330, a management system 340, a call processing system 350, a routing system 360, and/or a signaling system 370. Generally, input ports 310 may be the point of attachment for a physical link (not shown) and may be the point of entry for incoming traffic. Switching mechanism 320 may connect input ports 310 with output ports 330. Output ports 330 may store traffic and may schedule traffic for service on an output link (not shown). Management system 340 may enable communication between NMS/OSS 140 and components of network device 130. Call processing system 350 may manage processing and circuit allocation decisions for sharing protection bandwidth. Routing system 360 may participate in routing protocols. Signaling system 370 may activate paths between particular nodes.

Input ports 310 may carry out service adaptation, datalink layer encapsulation and decapsulation. Input ports 310 may look up a destination address of incoming traffic in a forwarding table to determine its destination port (i.e., route lookup). In order to provide quality of service (QoS) guarantees, input ports 310 may classify traffic into predefined service classes. Input ports 310 may run optical layer framing protocols, datalink-level protocols, or network-level protocols.

Switching mechanism 320 may be implemented using many different techniques. For example, switching mechanism 320 may include busses, crossbars, and/or shared memories. The simplest switching mechanism 320 may be a bus that may link input ports 310 and output ports 330. A crossbar may provide multiple simultaneous data paths through switching mechanism 320. In a shared-memory switching mechanism 320, incoming traffic may be stored in a shared memory and pointers to traffic may be switched.

Output ports 330 may store traffic before the traffic is transmitted on an output link (not shown). Output ports 330 may include scheduling algorithms that support priorities and guarantees. Output ports 330 may support datalink layer encapsulation and decapsulation, and/or a variety of higher-level protocols.

Management system 340 may connect with input ports 310, switching mechanism 320, output ports 330, call processing system 350, routing system 360, and signaling system 370. Management system 340 may communicate with NMS/OSS 130 and may perform provisioning, configuration, reporting, and/or maintenance functions for network device 150. Additional details of management system 340 are provided below in connection with FIG. 3B.

Call processing system 350 may construct a protection circuit group (PCG) database, an active/working circuit groups (ACG) database, compute a forwarding table(s), implement routing protocols, and/or run software to configure and/or manage network device 150. Call processing system 350 may include a processor, the PCG database, and the ACG database, routing tables, etc.

Routing system 360 may handle any traffic whose destination address may not be found in the forwarding table. Routing system 360 may include a routing engine or protocol processor, routing tables, etc. Signaling system 370 may activate paths between particular nodes and/or may implement signaling protocols for network device 150.

Although FIG. 3A shows exemplary components of network devices 150, in other implementations, network devices 150 may contain fewer or additional components than depicted in FIG. 3A. For example, in one implementation, one or more components of network devices 150 depicted in FIG. 3A may perform the tasks performed by other components of network devices 130. Although FIG. 3A shows network devices 150 as including routing system 360 (i.e., a distributed routing system for a network), in other implementations, a centralized routing system may be provided for a network and routing system 360 may be omitted from network devices 150.

FIG. 3B is an exemplary diagram of a device that may correspond to management system 340 of network device 150. As shown, management system 340 may include a bus 341, a processor 342, a memory 343, an interface 344 for input ports 310, an interface 345 for output ports 330, and a communication interface 346. Bus 341 may include a path that permits communication among the components of management system 340.

Processor 342 may include a processor, microprocessor, or processing logic that may interpret and execute instructions, such as instructions from an external source or from call processing system 350. Memory 343 may include a random access memory (RAM) or another type of dynamic storage device that may store information and instructions for execution by processor 342. Interfaces 344 and 345 may include a mechanism that permits interconnection with input ports 310 and output ports 330, respectively. Communication interface 346 may include any transceiver-like mechanism that enables management system 340 to communicate with other devices and/or systems, either internal or external. For example, communication interface 346 may include mechanisms for communicating with NMS/OSS 130 or components of network device 150, such as switching mechanism 320 and call processing system 350.

As will be described in detail below, management system 340 may perform certain operations to implement flexible shared mesh protection services. Management system 340 may perform these operations in response to processor 342 executing software instructions contained in a computer-readable medium, such as memory 343.

The software instructions may be read into memory 343 from another computer-readable medium or from another device via communication interface 346. The software instructions contained in memory 343 may cause processor 342 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3B shows exemplary components of management system 340, in other implementations, management system 340 may contain fewer or additional components that may provide a FSMP mechanism for control plane enabled networks. In still other implementations, one or more components of management system 340 may perform the tasks performed by other components of management system 340.

Figure 3C:
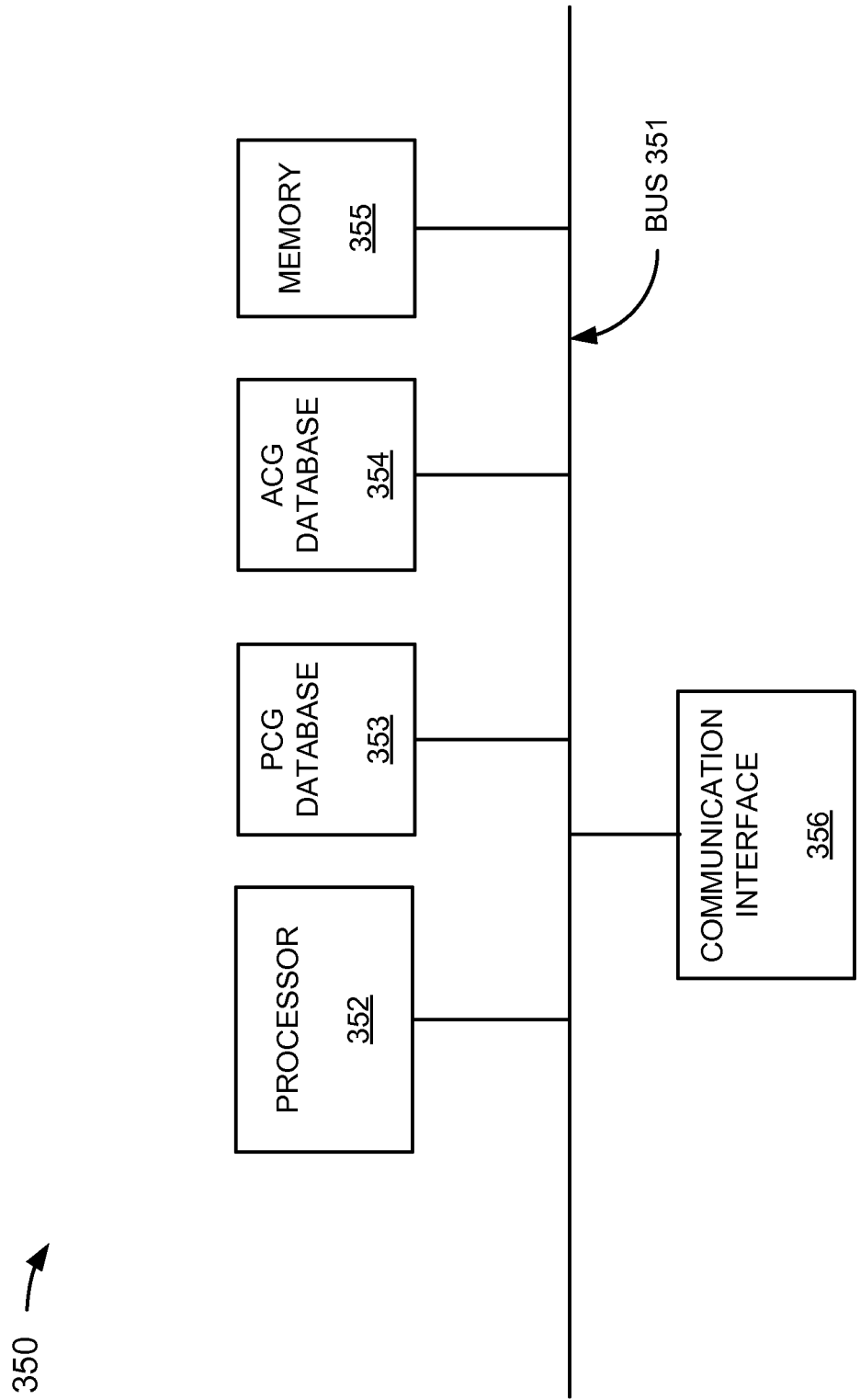
FIG. 3C is a diagram of a call processing system of the exemplary network device illustrated in FIG. 3A.

FIG. 3C is an exemplary diagram of a device that may correspond to call processing system 350. As shown, Call Processing system 350 may include a bus 351, a processor 352, a protection circuit group (PCG) database 353, an active circuit group (ACG) database 354, a memory 355, and a communication interface 356.

Bus 351 may include a path that permits communication among the components of routing system 350. Processor 352 may include a processor, microprocessor, or processing logic that may interpret and execute instructions. PCG database 353 may include a storage device that may store information and instructions for execution by processor 352. For example, PCG database 353 may store one or more PCG tables (PCGT) and or one or more PCG protection table (PPT). Similarly, ACG database 354 may include a storage device that may store information and instructions for execution by processor 352. For example ACG, database may store one or more ACG table. Exemplary PCGT, PPT and ACG tables and their uses are discussed in more detail with respect to FIGS. 6A, 6B, 7A and 7B. Memory 355 may include a RAM, ROM, another type of storage device that may store information and instructions for execution by processor 352. Memory 355 may optionally include forwarding tables, routing tables, or protocol information. Communications interface 356 may include a mechanism that permits interconnection with adjacent network devices 150.

As will be described in detail below, call processing system 350 may perform certain operations to implement flexible shared mesh protection services. Call processing system 350 may perform these operations in response to processor 352 executing software instructions contained in a computer-readable medium, such as PCG database 353 and/or ACG database 354.

Link status information and/or software instructions may be read into PCG database 353 and/or ACG database 354 from another computer-readable medium, such as memory 355, or from another device. The information and instructions contained in PCG database 353 and/or ACG database 354 may cause processor 352 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3C shows exemplary components of call processing system 350, in other implementations, call processing system 350 may contain fewer or additional components that may provide a FSMP mechanism for control plane enabled networks that perform end-to-end path routing. In still other implementations, one or more components of call processing system 350 may perform the tasks performed by other components of call processing system 350.

An IOTN may consist of multiple CP domains interconnected with E-NNIs. For example, I-NNI domains 110-1, 110-2 and 110-3 of FIG. 1 may each be a separate CP domain. In certain implementation, each CP domain can be defined to coincide with a vendor platform domain or a network provider's administrative domain. There may be multiple ways to provision an end-to-end circuit with certain protection and restoration (P&R) requirements. One way is to implement the desired P&R scheme within an individual domain (e.g., each of I-NNI domains 110-1, 110-2 an 110-3) and over each E-NNI (e.g., E-NNI 120), so that implementations on the I-NNI domains and E-NNIs are totally independent from each other.

Figure 4A:
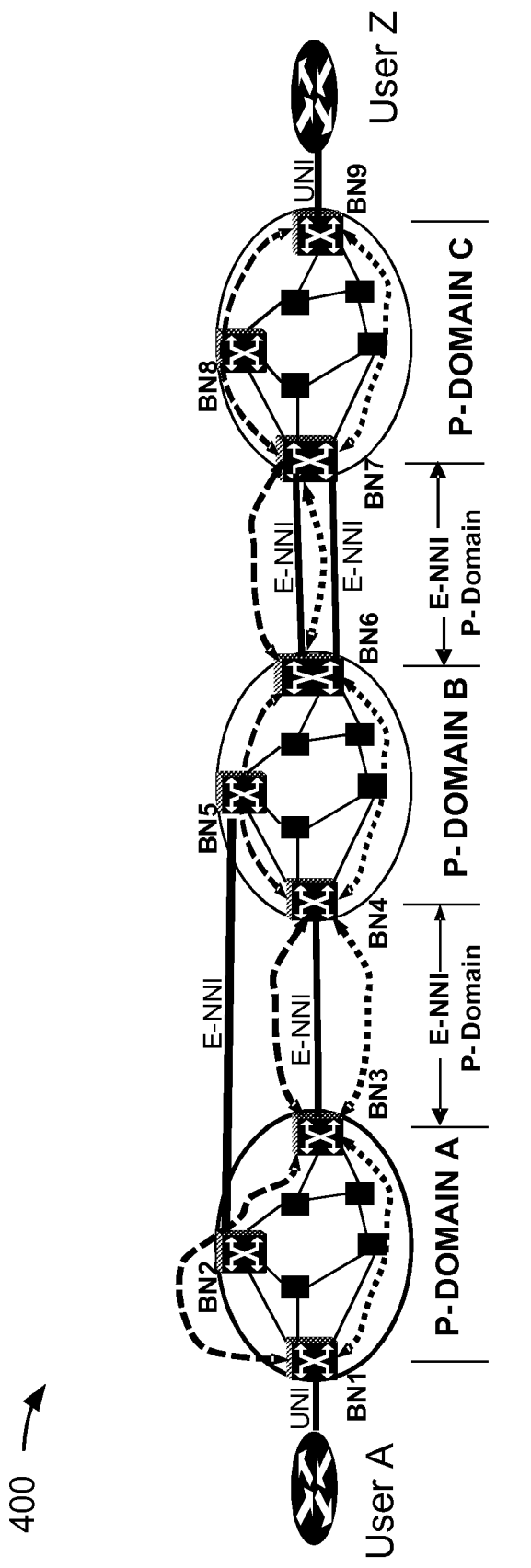
FIG. 4A is a diagram of an exemplary 1+1 mesh protection service shown with five protection domains.

FIG. 4A shows an example of a system 400 including a 1+1 protected end-to-end circuit provisioned by the CP using five 1+1 protected segments over Domains A, B, and C and two E-NNIs. Each segment represents fully-diverse working and protection paths within the local domain or E-NNI. The end-to-end circuit is 1+1 protected segmentally, but from end user point of view the circuit is 1+1 protected end-to-end. In this approach, each CP domain is defined as a protection domain (P-domain). Any end-to-end P&R requirement can be implemented by multiple P-domains, as exemplified in FIG. 4A for 1+1 protection.

Figure 4B:
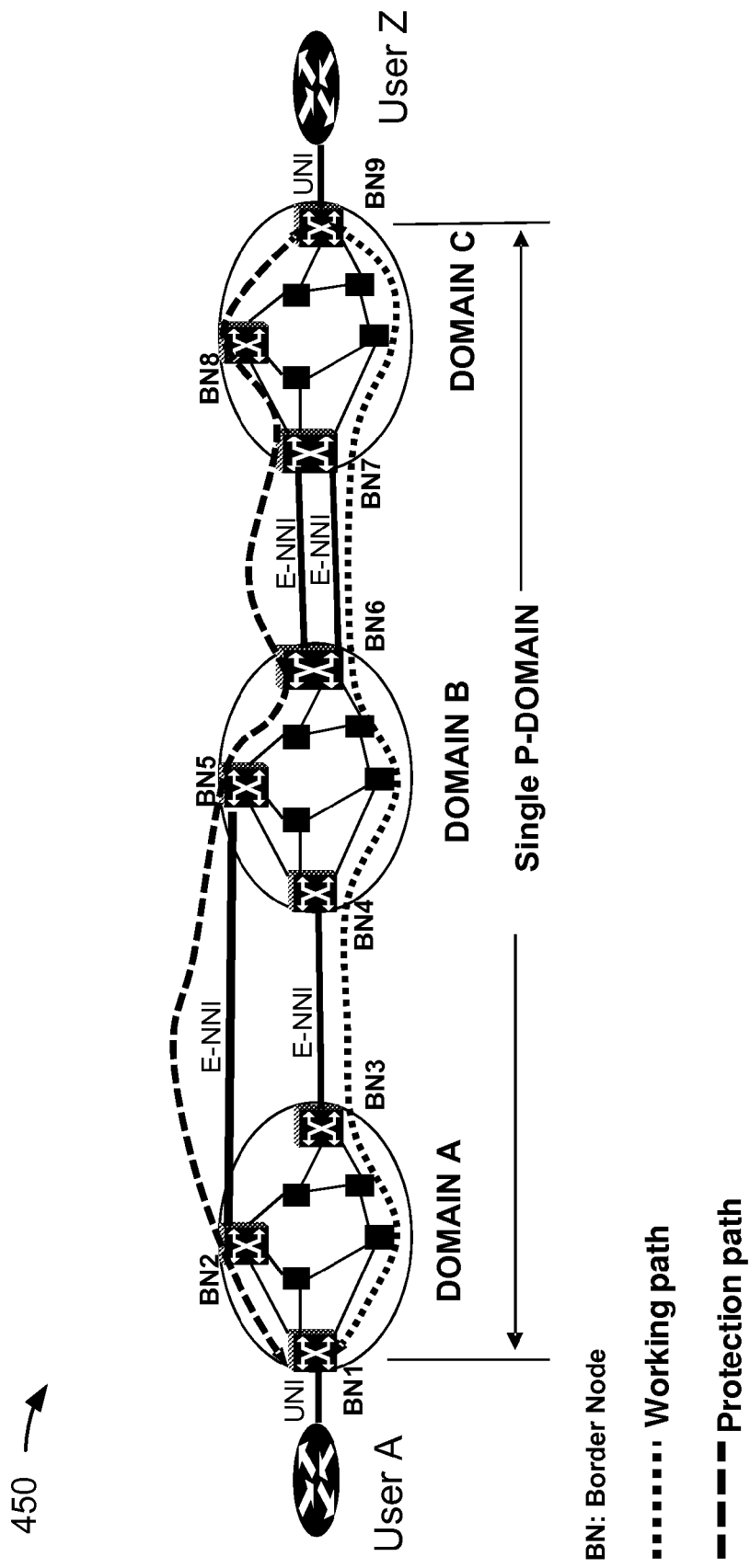
FIG. 4B is a diagram of an exemplary 1+1 mesh protection service shown with a single protection domain.

Another way to support end-to-end P&R is to treat all CP domains within an IOTN as one single P-domain, as illustrated in FIG. 4B. FIG. 4B shows an example of a system 450 where the end-to-end working and protection paths are calculated as two end-to-end paths which are fully diverse (both link and node) from the source to the destination node. This approach may be called single P-domain approach. There can be many other approaches using different ways to combine individual P-domains to meet an end-to-end P&R requirement. Similar to the foregoing 1+1 P&R example, FSMPS circuits as described herein can be implemented using a combination of multiple P-domains or a single P-domain.

When a service request arrives at a source node, the source node may need an indication of what P&R is requested for the FSMP service in order to implement the service in the source node's P-domain. A "Service Level" indicator, discussed in more detail with respect to FIG. 16, may provide the necessary indication for each service node.

Figure 5A:
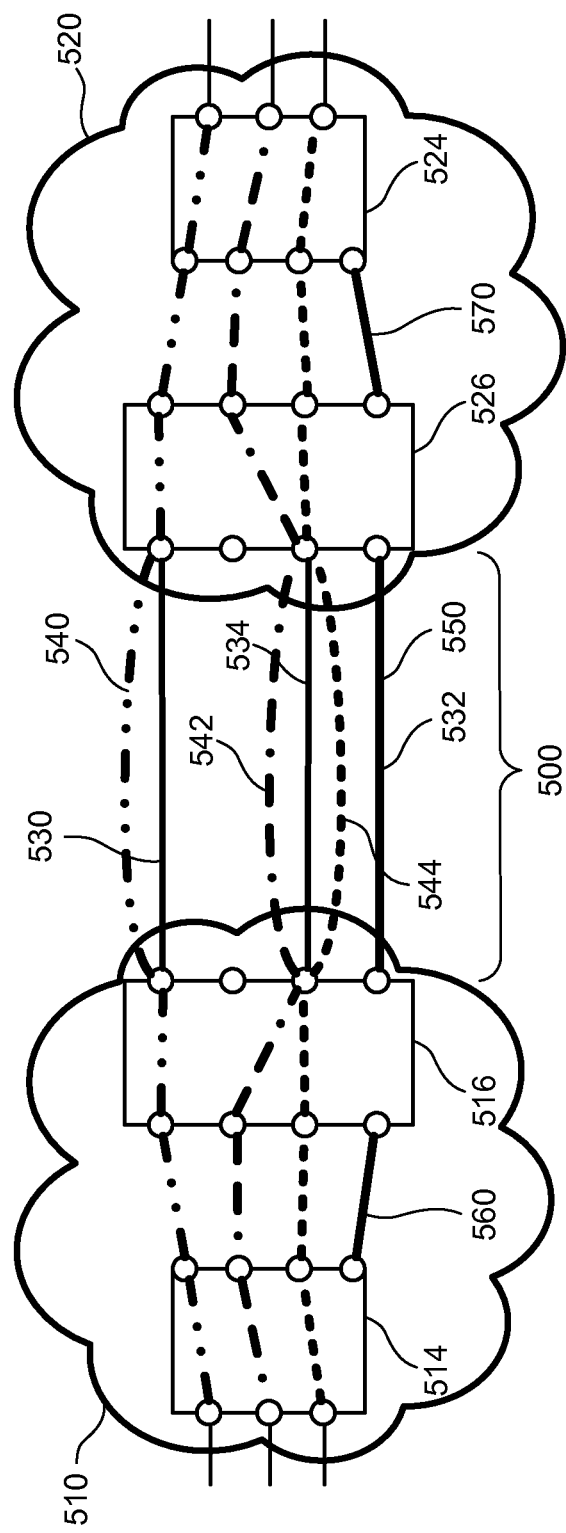
FIG. 5A is a diagram of an exemplary flexible shared mesh protection service shown in normal operation over an exemplary network.

FIG. 5A is a diagram of an exemplary FSMPS setup shown in normal operation over an exemplary E-NNI P-domain 500 in one implementation. E-NNI P-domain 500 joins first domain 510 and second domain 520. First domain 510 and second domain 520 may be connected by multiple E-NNI links, including E-NNI links 530, 532, and 534. Multiple I-NNI links may connect network devices, such as network devices 514 and 516 within domain 510 and network devices 524 and 526 within domain 520. Three SONET client circuits 540, 542, 544 of different types may be connected between network devices 514 and 524. Client circuits 540, 542, 544 share one protection circuit in E-NNI P-domain 500. Protection circuit 550 serves between domains 510 and 520. Domain 510 may select three mutually disjointed prototype paths to domain 520 (one for each of circuits 540, 542 and 544) which are fully diverse from protection circuits 550, 560, and 570. Client circuits 540, 542, and 544 may form an ACG for E-NNI P-domain 500.

In the example of FIG. 5A, if faults occur within any of E-NNI links 530 or 534, circuit restoration using FSMPS may take place within the faulted domain. The customer circuits along the I-NNI links in domains 510 and 520 may not be affected.

Figure 5B:
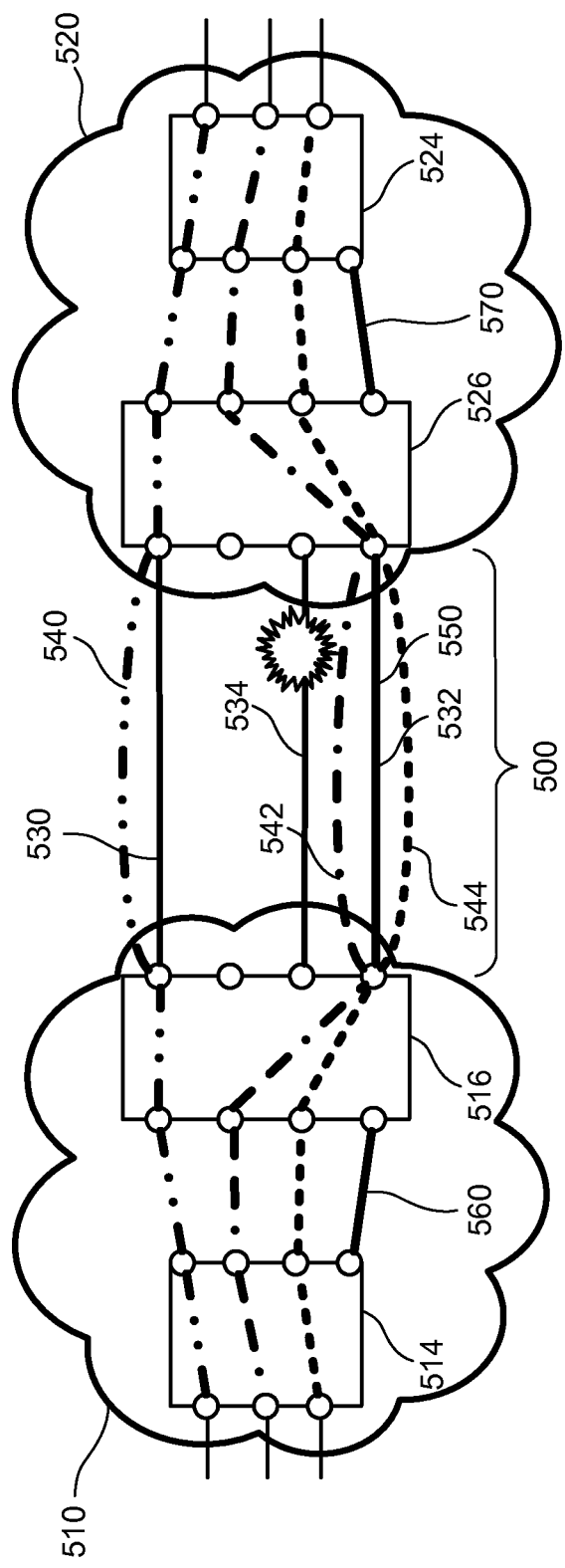
FIG. 5B is a diagram of an exemplary flexible shared mesh protection service shown compensating for a network failure over an exemplary network.

FIG. 5B is a diagram of an exemplary FSMPS setup shown compensating for a network failure in E-NNI P-domain 500. More particularly, FIG. 5B shows E-NNI P-domain 500 with a failure of E-NNI link 534 and circuit restoration using FSMPS. Customer circuits 542 and 544 have been switched from E-NNI link 534 to protection circuit 550 on E-NNI link 532. The switch of customer circuits 542 and 544 to E-NNI link 532 may be temporary. After repairing the failure of E-NNI link 534, customer circuits 542 and 544 may be switched from link 532 back to link 534.

Figure 5C:
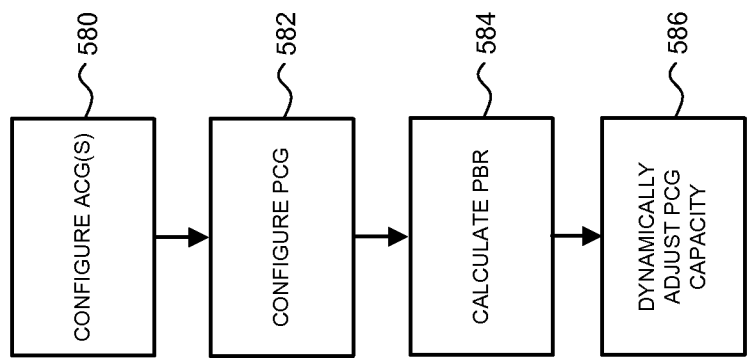
FIG. 5C is a flow diagram of an exemplary process flow for setting up a flexible shared mesh protection service mechanism.

FIG. 5C provides a flow diagram of an exemplary process flow 500 for setting up a FSMP mechanism. The FSMP mechanism described herein may include two kinds of circuit groups: a protection circuit group (PCG) and one or more active/working circuit groups (ACG). The two types of circuit groups may be used within in each P-domain to support the FSMPS service in each P-domain. A primary protection circuit and all secondary protection circuits may belong to the PCG. All client circuits which are subject to protection may be members of one or more ACGs. A database of tables may be created as the service database to keep track of all provisioning and protection switching activities within each circuit group. The construction of the circuit groups and the formulation of the database tables are further discussed below with respect to FIGS. 6A, 6B, 7A and 7B.

Still referring to FIG. 5C, one or more active/working circuit group (ACG) may be configured (block 580). Regarding ACG construction, a service provider can pre-select multiple preferred, fully-SRLG disjoint prototype paths between nodes of interest within a P-domain (such as the two fully-SRLG disjoint E-NNI links 530 and 534 between network devices 516 to 526 in FIGS. 5A and 5B). The selected prototype paths (Prtp-path) can be mutually SRLG disjoint and best-effort node disjoint. These prototype paths can also be fully SRLG and fully node disjoint from the protection circuits in PCG. Each selected prototype path with associated SRLG values may define an ACG in the P-domain.

A primary protection circuit group (PCG) may be configured (block 582). Regarding PCG construction, a service provider may build out one initial PCG between two nodes of interest within a P-domain (such as, e.g., circuit, 532 between network devices 516 to 526 in FIGS. 5A and 5B) with a bandwidth, BW-P, dedicated to protect all circuits provisioned by FSMPS customers within the P-domain. The PCG can be setup using one of several control plane protection schemes, including, for example, unprotected, mesh or SONET/SDH 1+1 protected with full SRLG diversity and full node diversity, mesh 1+1 protected with full SRLG diversity and best-effort node diversity, mesh 1+1 protected with full SRLG diversity and no node diversity, or a full-time 1+1 protection. PCG bandwidth can be used to transport select customer traffic when the bandwidth is not used to protect ACG circuits (i.e., BW-P may be used to support extra traffic). Multiple protection circuits may be allowed in the PCG as more FSMPS customers are added. With multiple PCG protection circuits, each additional PCG protection circuit can be co-routed with the primary protection circuit (i.e., passing through the same node-sequence as the primary), but may use diverse SRLG links. The working and protection paths of a new PCG circuit can be co-routed with the working and protection paths of the primary PCG circuit, respectively.

A protection bandwidth ratio (PBR) may be calculated (block 584). The PBR may be defined as the ratio of total bandwidth of the ACG divided by total available protection bandwidth (TAPB) in the PCG. The PBR may be evaluated and compared with a particular threshold.

The capacity of the protection circuit may be dynamically adjusted (block 586). The capacity of the PCG circuit may be adjusted, for example, when the PBR falls above or below the particular threshold or threshold range (e.g., the PBR/threshold comparison represents insufficient protection bandwidth or the PBR/threshold comparison represents inefficient protection bandwidth allocation). Changes to the PBR may be a result of, for example, changes to the required bandwidth of an ACG or the addition of a new ACG to the protection domain.

FIGS. 6A and 6B show exemplary tables that may be included in a PCG database, such as PCG database 353. FIG. 6A shows an exemplary PCG Table (PCGT) 610, and FIG. 6B shows an exemplary PCG Protection Table (PPT) 620. PCGT 610 may include information for the construction of protection circuit(s) over one or more E-NNI and/or I-NNI links. PCGT 610 may register all protection circuits created to support FSMPS within a P-domain and the current status of each protection circuit. PCGT 610 also keeps track of available bandwidth for protection (ABP) in each protection circuit, total available protection bandwidth (TAPB) of the PCG, and the protection type and SRLG values of each protection circuit. PPT 620 may keep track of all active circuits that are rerouted to the protection circuits due to faults and the current status of each rerouted circuit. PPT may track the protection circuit number (Prot. CKT No.) used, bandwidth (BW), type, time slots, the original active circuit group number (ACG ID) and the original SRLG. PPT 620 may also track the total restored bandwidth (Total Restored BW) of the rerouted circuits.

Each ACG may be associated with an ACG Table. FIGS. 7A and 7B show exemplary tables 710, 720 that may be included in an ACG database, such as ACG database 354. Each ACG table is associated with a prototype path (Prtp-Path). Each ACG table 710, 720 may include information of active circuits that are provisioned over a selected prototype path within a P-domain. Each ACG table 710, 720 includes circuit information, such as the circuit identification (Circuit ID), bandwidth (BW), circuit type (Type), SRLG, and current status, for each circuit assigned to the ACG. An ACG may keep track of the total bandwidth requirement of all circuits, and register the current PBR.

Generally, FSMPS circuits may be set up by the control plane through a P-domain along one of the pre-selected prototype paths (Prtp-path). The control plane might use the pre-selected Prtp-paths in a round-robin fashion to support load balancing. An entry in an associated ACG table may be added for each new FSMPS circuit with the new circuit's bandwidth, type, and SRLG logged into the ACG table. In cases where the control plane cannot create a FSMPS circuit along any Prtp-path, the control plane may be allowed to select a path for the circuit through the network that is fully SRLG and node diverse from the protection circuits in PCG. The circuit may be called a non-conforming circuit. After the non-conforming circuit is setup, the non-conforming circuit's SRLG values can be compared with the "Base SRLGs" of each ACG table, such as ACG tables 710, 720. When one of the non-conforming circuit's SRLG values matches any in the "Base SRLG" of an ACG, the circuit can be added to the corresponding ACG table. As a result, a non-conforming FSMPS circuit may be registered in multiple ACG tables, such as for example "Ckt 3" shown in ACG tables 710 and 720.

Figure 8:
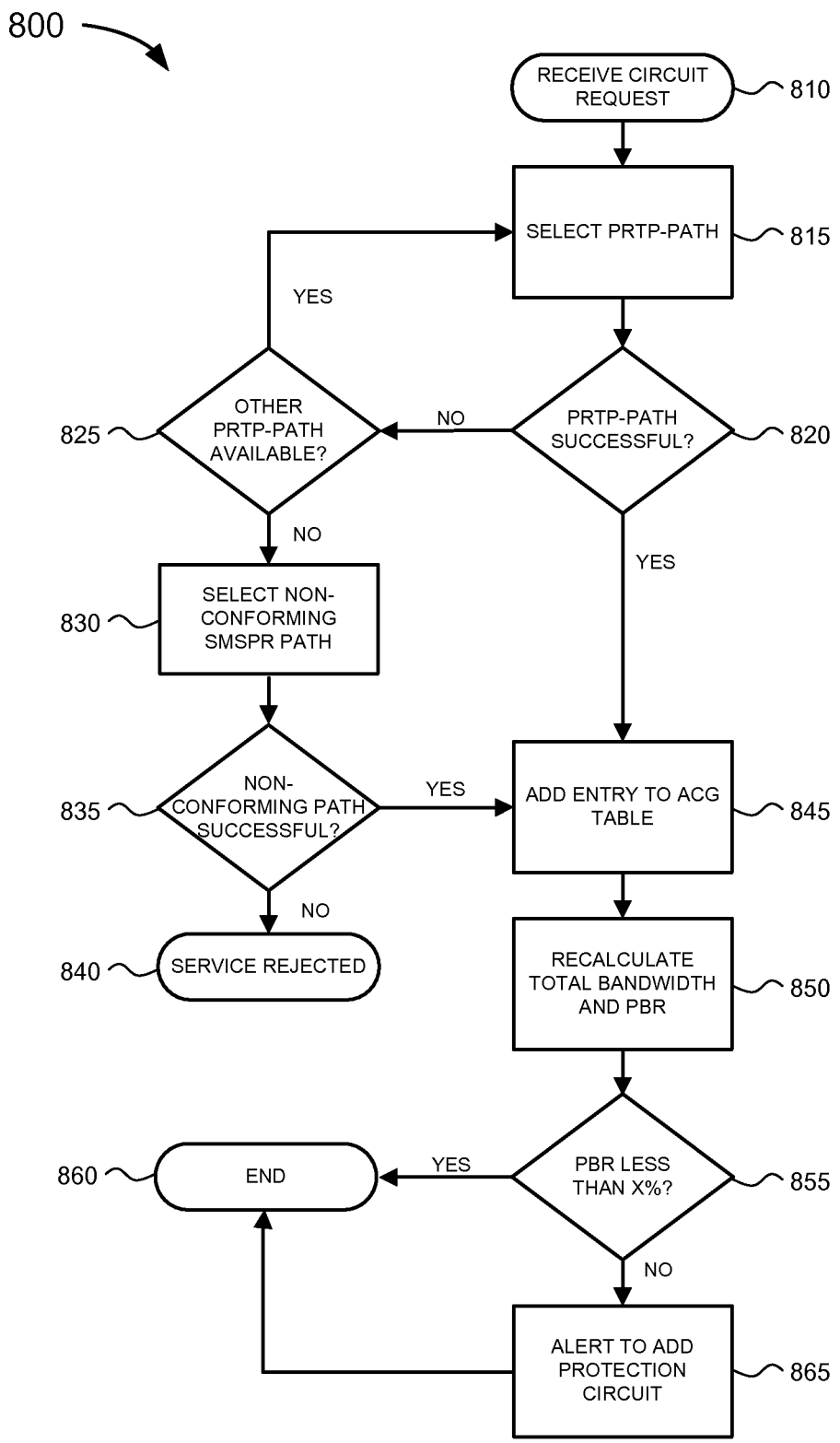
FIGS. 8-15 are flow diagrams illustrating exemplary portions of an exemplary flexible shared mesh protection service according to implementations described herein.

FIG. 8 provides an exemplary flow diagram 800 of FSMPS activities when a circuit request is received at the network. A circuit request for a circuit with FSMPS may be received (block 810). When the circuit request arrives, a Prtp-path may be selected (block 815). For example, the control plane may select a Prtp-path from a pre-selected group (e.g., the next Prtp-path in a round-robin group) to set up a sum of match scores penalized (SMSPR) circuit. In block 820, it can be determined if the selected Prpt-path is successfully set up. For example, the control plane may verify if a functional path through a P-domain has been established within the parameters of the ACG. If unsuccessful, a check may be made for availability of other conforming circuits from the pre-selected group (block 825). If other conforming circuits are available, another Prtp-path may be selected (block 815). For example, the control plane may try the next Ptrp-path from the round-robin group until the path is setup successfully. If no other conforming circuits are available, a non-conforming SMSPR path may be selected (block 830). For example, when all Ptrp-paths are tried without success, the control plane may try to setup a non-conforming SMSPR path. In block 835, it can be determined if the selected non-conforming SMSPR is successfully set up. For example, the control plane may verify that a functional path through a P-domain has been established. If unsuccessful, FSMPS may be rejected (block 840). If it is determined either the Prtp-path (block 820) or the non-conforming SMSPR path (block 835) is successful, the circuit may be added to the ACG. In block 845, an entry for the successful path may be added to an ACG table. For example, when the circuit is setup successfully, the control plane can add an entry to the corresponding ACG table. In block 850, total bandwidth and PBR for the ACG can be recalculated. For example, the control plane may recalculate the total bandwidth requirement and PBR for the ACG. In block 855, the PBR of the ACG may be evaluated and compared with a particular minimum threshold (e.g., the value "X %"). For example, the control plane may check if the PBR of each ACG is less than 80 percent. If all the PBRs are less than X percent, the circuit request is completed and the activity ends (block 860). If any PBR is greater than X percent, the control plane may alert a network operator to add another protection circuit in the PCG (block 865) before the activity ends (block 860). Logic activities for adding a new protection circuit is described in more detail with respect to FIG. 13.

Figure 9:
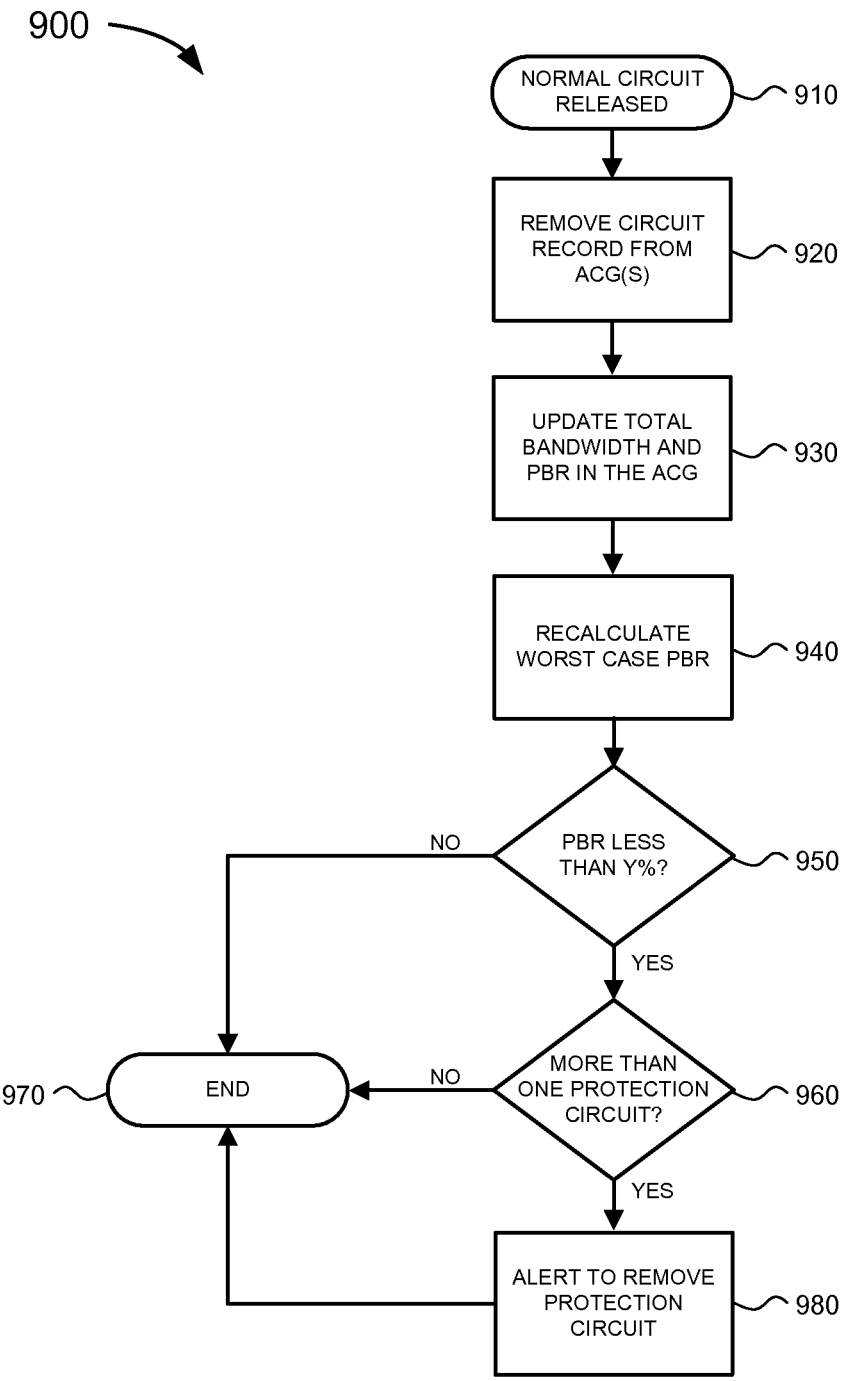

FIG. 9 provides an exemplary flow diagram 900 of FSMPS activities when a normal circuit is released from the network. The normal circuit (in contrast with, for example, a restored circuit) having FSMPS is released (block 910). For example, a customer may discontinue use of an end-to-end circuit including endpoints of the FSMPS circuit, providing a signal that the normal circuit may be released. The circuit record for the normal circuit can be removed from all ACGs (block 920). For example, the control plane may search the stored ACG tables for circuit numbers corresponding to the number of the circuit being released and remove that circuit number and corresponding information from the ACG table. The total bandwidth and PBR in the ACG can be updated (block 930). For example, if circuit "Ckt 3" shown in ACG tables 710 and 720 was to be released, the control plane may remove the "Ckt 3" circuit from ACG tables 710 and 720 and update the Total BW and PBR in each of ACG tables 710 and 720. In block 940, a worst case PBR may be recalculated. In block 950, the worst case PBR can be compared against a particular threshold (e.g., the value "Y %" where, for example, Y may be a value significantly smaller than the value of X in block 855 of FIG. 8). In block 960, the number of protection circuits in the PCG may be evaluated. If the worst case PBR is greater than Y %, the activity is complete (block 970). If the ratio is not greater than Y % and there is more than one protection circuit in the PCG, a network operator may be alerted about the possibility of removing a secondary protection circuit (block 980) before the activity ends (block 970). Thus, the bandwidth of dedicated protection circuits may be kept to a particular capacity percentage, allowing unneeded protection circuit capacity to be re-allocated to other circuits. Activities for removing a protection circuit are described in more detail with respect to FIG. 14.

Figure 10:
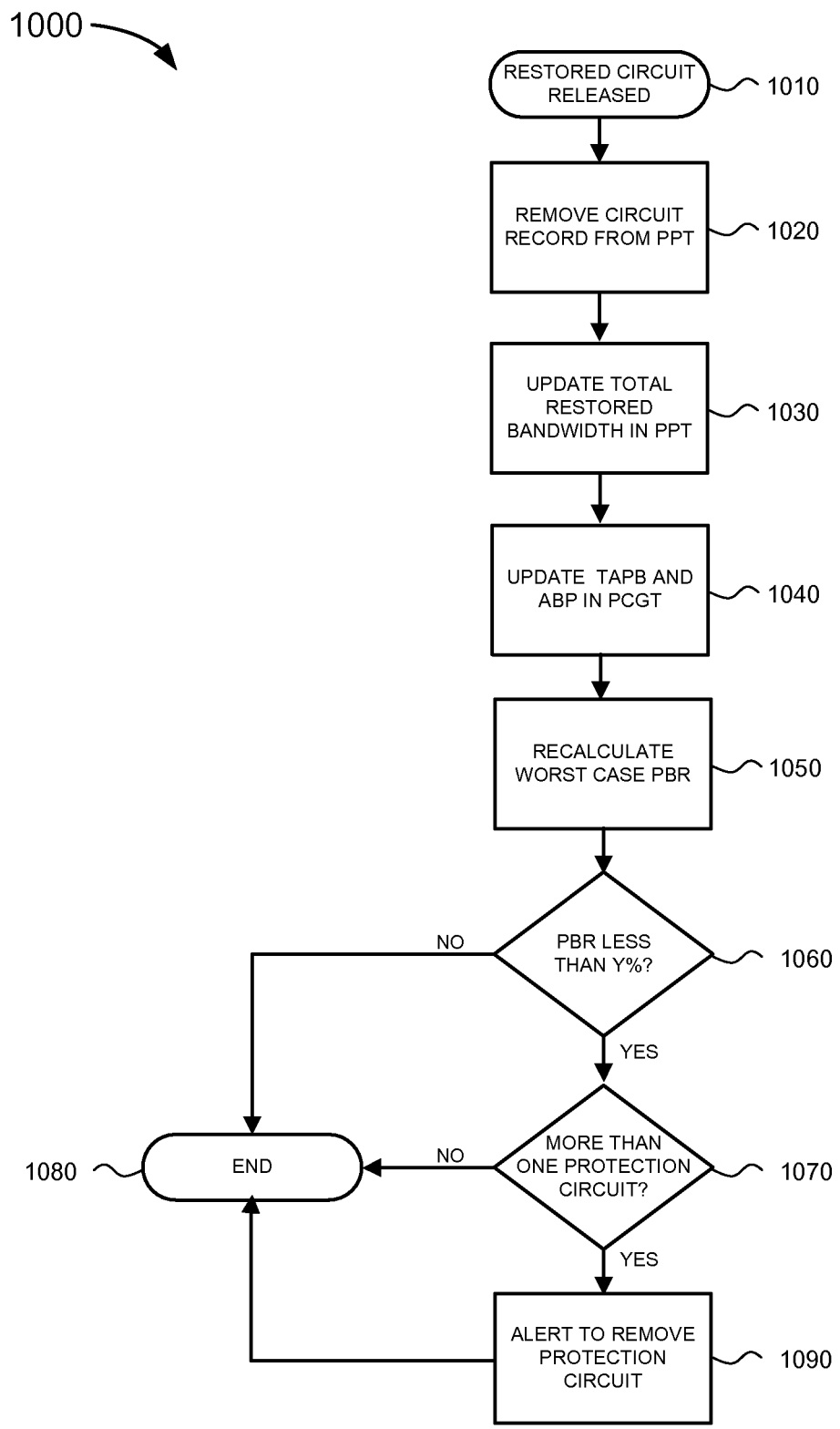

FIG. 10 provides an exemplary flow diagram 1000 of FSMPS activities when a restored circuit is released from an FSMPS network. The restored circuit (e.g., a circuit previously restored to protection bandwidth) is released (block 1010). For example, a circuit may have been previously been switched to a protection circuit (such as "Ckt Z" in PPT 620 of FIG. 6B) due to a failure in the originally-dedicated active/working circuit. The customer may discontinue use of a restored circuit through an FSMPS P-domain, providing a signal that the circuit may be released. The circuit record for the restored circuit can be removed from the PPT (block 1020). For example, the control plane may remove "Ckt Z" from PPT 620. After the circuit record is removed, counts in the PCGT, the PPT and the ACGs can be updated. The total restored BW may be updated in the PPT (block 1030). For example, if "Ckt Z" was being removed, the control plane may update the "Total Restored BW" in PPT 620 from "16 STS1s" to "4 STS1s." The TAPB and the ABP may be updated in the PCGT (block 1040). For example, if "Ckt X" (with a bandwidth of 3 STS1s) was being removed from the PPT, the control plane may update the "TAPB" in PCGT 610 from "32 STS1s" to "35 STS1s" and the ABP for "Protection CKT A" may be changed from "20 STS1s" to "23 STS1s."

Still referring to FIG. 10, the PBRs in all ACGs may also be updated as follows. In block 1050, the worst case PBR may be recalculated. In block 1060, the worst case PBR can be compared against a particular threshold (e.g., the value "Y %" where, for example, Y may be a value significantly smaller than the value of X in block 855 of FIG. 8). In block 1070, the number of protection circuits in the PCG may be evaluated. If the worst case PBR is greater than Y %, the activity is complete (block 1080). If the ratio is not greater than Y % and there is more than one protection circuit in the PCG, a network operator may be alerted about the possibility of removing a secondary protection circuit (block 1090), so that unneeded protection circuit capacity can be re-allocated to other circuits. After the network operator is alerted the activity may end (block 1080).

Figure 11:
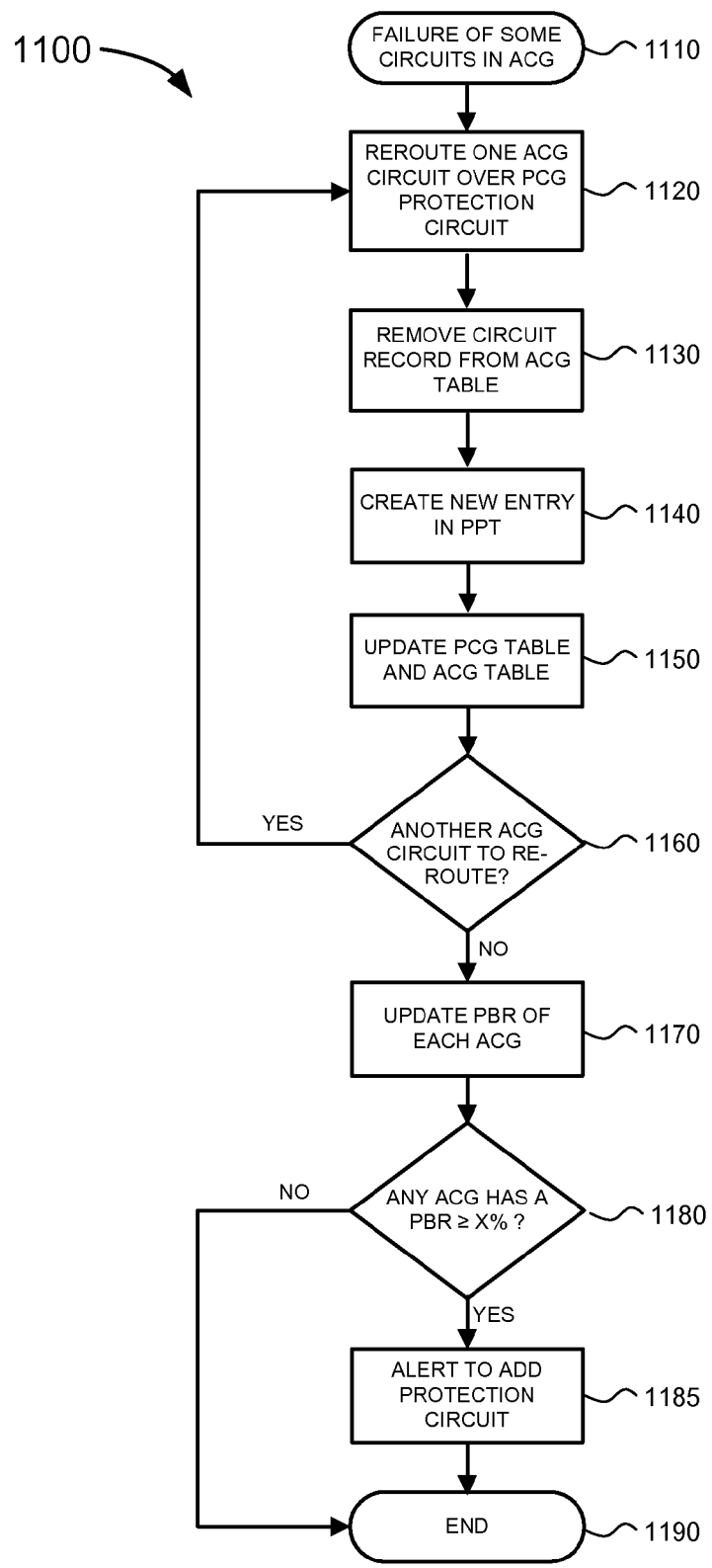

FIG. 11 provides an exemplary flow diagram 1100 of FSMPS activities when a network failure occurs that affects some circuits in ACGs. The failure of one or more circuit in an ACG may occur (block 1110). For example, a failure may occur in a link affecting "Ckt 1" and "Ckt 2" in ACG tables 710 of FIG. 7A. When a failure occurs, the two ends of the circuit can coordinate with each other to re-route the affected ACG circuits over to PCG protection circuits one-by-one (block 1120). For example, failed "Ckt 1" may be re-routed over PCG protection circuit "Ckt X" shown in PPT 620 of FIG. 6B and failed "Ckt 2" may be re-routed over PCG protection circuit "Ckt Y" also shown in PPT 620. For each re-routed circuit, updates may be made to the ACG table(s), PCGT, and PPT. The circuit record may be removed from its respective ACG table (block 1130). For example, the entries for "Ckt 1" and "Ckt 2" may be removed from ACG table 710. An entry may be created in the PPT to record the new circuit identification, original ACG ID, and the time slots of the restored circuit (block 1140). For example, "Ckt X" in PPT table 620 may include a reference to Original ACG ID "1," time slots "1-3," and Original SRLG "2, 23, 45, 64." The PCG table and ACG table(s) may also be updated by recalculating the ABP & TAPB in the PCG and total bandwidth & PBR for the affected ACGs (block 1150). A check may be made for another ACG circuit to re-route (block 1160). If there is another circuit to re-route then the course of action may be repeated beginning at block 1120. If there is not another ACG circuit to re-route, then the PBR of each ACG may be updated (block 1170). In block 1180, the PBR of each ACG may be evaluated and compared with a particular minimum threshold (e.g., the value "X %"). If any ACG has a PBR that is greater than or equal to X percent, a network operator may be alerted to add a protection circuit in the PCG (block 1185). Once the network operator is alerted, or if the PBR of each ACG is less than X percent in block 1180, then the activity ends (block 1190).

Figure 12:
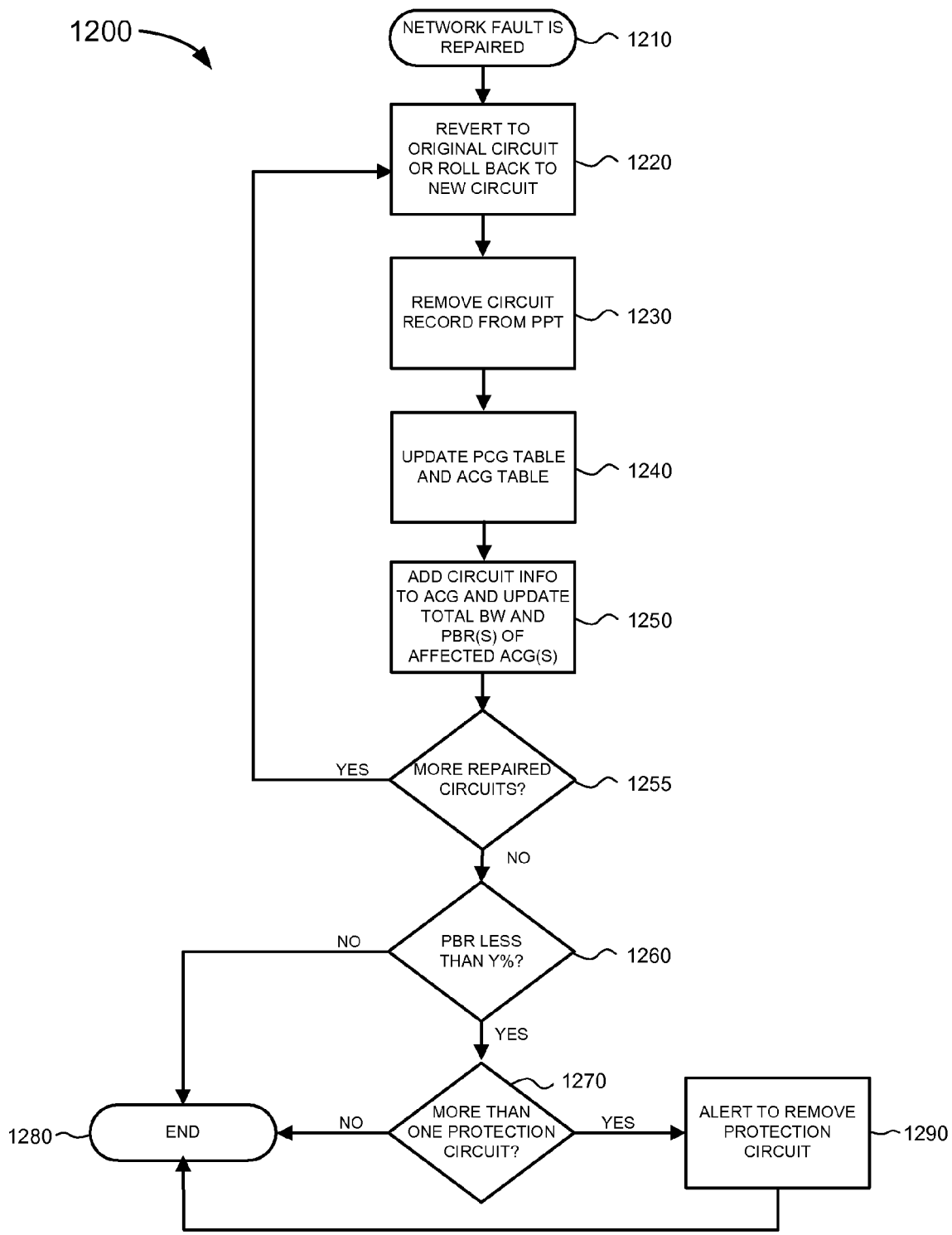

FIG. 12 provides an exemplary flow diagram 1200 of FSMPS activities when a network failure is fixed. The fault in one or more circuits in an ACG may be repaired (block 1210). For example, a circuit may have been previously been switched to a protection circuit (such as "Ckt X" in PPT 620 of FIG. 6B) due to a failure in the originally-dedicated active/working circuit (such as "Ckt 1" in ACG table 710). Once the failure in the originally-dedicated active/working circuit has been repaired and the circuit is rolled back to the original active/working circuit, the restored circuit may be released. When a network fault is fixed, SMSPR circuits affected by the fault can be either reverted back to their original circuit (if the circuit is not torn-down) or rolled back to a new circuit created along the Prtp-path of the original ACG (block 1220). For example, PCG protection circuit "Ckt X" shown in PPT 620 of FIG. 6B may be re-routed back to "Ckt 1" (in ACG table 710) when the original active/working circuit is repaired. For each reverted or rolled-back SMSPR circuit, updates may be made to the affected ACG table(s), PCGT, and PPT. The circuit record for the SMSPR circuit in the PPT may be removed (block 1230). For example, the circuit record for "Ckt X" in PPT 620 may be removed. The TAPB and ABP in the PCGT can then be updated (block 1240). For example, if "Ckt X" (with a bandwidth of 3 STS1s) was being removed from the PPT, the control plane may update the "TAPB" in PCGT 610 from "32 STS1s" to "35 STS1s" and the ABP for "Protection CKT A" may be changed from "20 STS1s" to "23 STS1s." The circuit may then be added back to its original ACGs with the required circuit information and total bandwidth & PBRs of affected ACGs updated (block 1250). A check for more repaired circuits may be made (block 1255). If there is another circuit to revert or roll back, then the course of action may be repeated beginning at block 1220. After all affected circuits are reverted or rolled back, the worst case PBR may be recalculated. The worst case PBR can be compared against a particular Y % threshold (block 1260). In block 1270, the number of protection circuits in the PCG may be evaluated. If the worst case PBR is greater than Y %, the activity is complete (block 1280). If the ratio is not greater than Y % and there is more than one protection circuit in the PCG, a network operator may be alerted about the possibility of removing a secondary protection circuit (block 1290).

Figure 13:
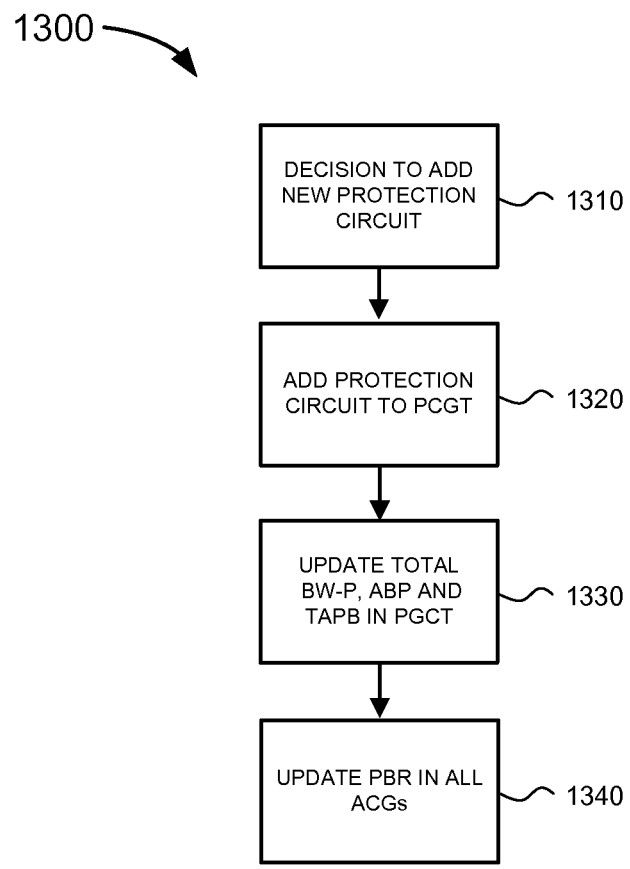

FIG. 13 provides an exemplary flow diagram 1300 of FSMPS activities when a network operator decides to add a new protection circuit in the PCG. A decision is made to add a new protection circuit in the PCG (block 1310). The decision may include identifying the desired bandwidth and determining that the new circuit be of the same protection type (e.g., 1+1 or unprotected) as existing circuits in the PCG. The new protection circuit may be co-routed with the primary protection circuit. The new protection circuit may be added to PCGT (block 1320). The total BW-P, ABP, and TAPB counts in the PCGT may be updated (block 1330). The PBRs in all ACGs can be updated (1340).

Figure 14:
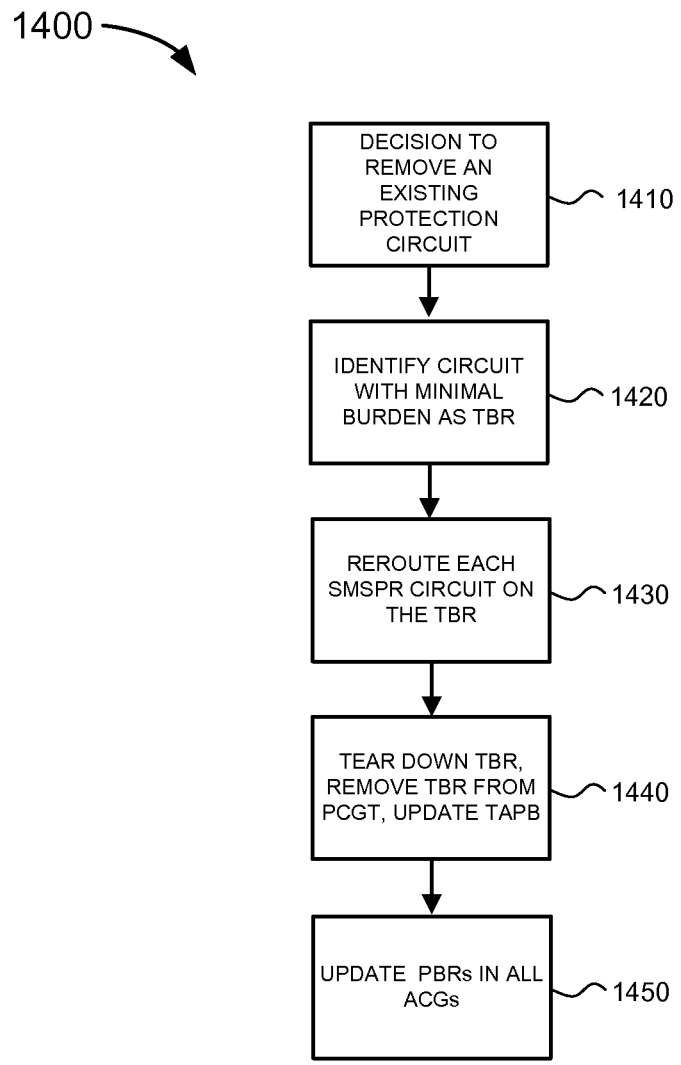

FIG. 14 provides an exemplary flow diagram 1400 of FSMPS activities when a network operator decides to remove one protection circuit in a PCG. A decision may be made to remove one protection circuit in a PCG (block 1410). For example, the network operator may choose to remove an unnecessary protection circuit to allow that circuit capacity to be used elsewhere. All secondary protection circuits can be scanned to identify the protection circuit that carries the minimal number or bandwidth of restored circuits (block 1420). The protection circuit that carries the minimal number or bandwidth of restored circuits may be designated as "TBR" (to be removed). Each SMSPR circuit on the TBR may be re-routed (block 1430). The re-routing of each circuit may be accomplished by (1) creating a new SMSPR circuit with the same attributes in another protection circuit; (2) coordinating between end points using signaling to roll over the SMSPR circuit to the new circuit; (3) updating the ABP of the affected protection circuit in the PCGT; and (4) revising circuit information of the re-routed circuit in the PPT. After all the circuits on TBR are migrated to other protection circuits, the TBR may be torn down, its entry removed from the PCGT, and the TAPB updated for the PCGT (block 1440). If any migration fails, the TBR protection circuit may not be removed. If the migrations are successful, the PBRs in all the ACGs may be updated (block 1450).

Figure 15:
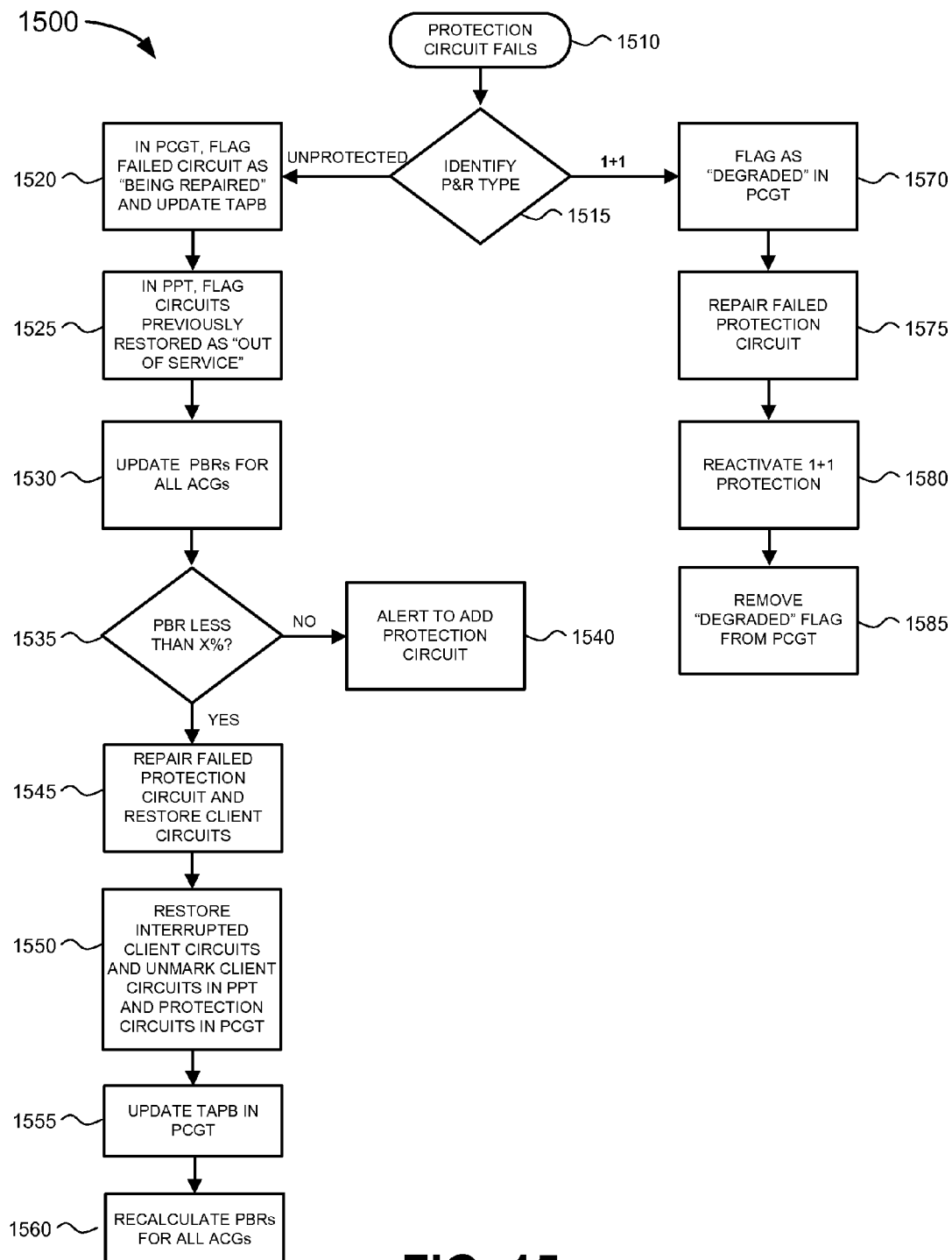

FIG. 15 provides an exemplary flow diagram 1500 of certain FSMPS activities when a protection circuit fails. When a protection circuit fails, there may be many possible scenarios depending on the protection and restoration (P&R) types implemented for the protection circuits. In flow diagram 1500, exemplary actions for two P&R types are provided. In one P&R type, the circuit is unprotected, and in another P&R, type the circuit is 1+1 protected. A protection circuit fails (block 1510), and the P&R type of the protection circuit may be identified (block 1515). In FIG. 15, only two P&R types are provided. However other P&R types may be used.

If the protection circuit is identified as "Unprotected," SMSPR protection may be lost on the failed protection circuit. Note that other protection circuits in the PCG may not fail. All client SMSPR circuits restored to the failed PCG circuit may be interrupted until the protection circuit can be repaired and put back in service. In block 1520, the failed protection circuit may be flagged as "Being Repaired" in the PCGT and the TAPB updated in the PCGT. In block 1525, the affected client circuits previously restored to the failed circuit may be flagged as "Out-of-Service" in the PPT. In block 1530, the PBRs for all ACGs may be re-calculated. In block 1535, the PBR of the ACG may be evaluated and compared with a particular minimum threshold (e.g., the value "X %"). If the PBR is not less than X percent, a network operator may be alerted to add a protection circuit in the PCG (block 1540). In block 1545, the failed protection circuit may be repaired. In block 1550, all interrupted client circuits may be restored by unmarking the client circuits in the PPT and the protection circuits in PCGT. In block 1555, the TAPB may be updated in the PCGT. In block, 1560, the PBRs for all ACGs can be re-calculated.

If the protection circuit is identified as "1+1 protected," protection switching can take place so that all client restored circuits are protected in the event of the protection circuit failure. There may be no change to the TAPB count in the PCGT. In block 1570, the protection circuit in the PCGT can be marked as "Degraded." In block 1575, the failed protection circuit—that is the previously active protection circuit—may be repaired. Once the failed protection circuit is repaired, the 1+1 protection may be re-activated for the protection circuit (block 1580). The "degraded" flag in the PCGT may then be removed (block 1585).

The service actions described herein with respect FIGS. 8-15 may illustrate different situations in a service provider's FSMPS service. Other situations may occur and can be treated as exceptions according to the general principles described herein.

Circuit and restoration related activities (e.g., "set up," "tear-down," "release," "restore," "protection switching," "end-point coordination," etc.) discussed in FIGS. 8-15 above may be carried out according to IOTN control plane signaling and routing procedures as specified by international standards bodies, such as the Internet Engineering Task Force (IETF) Generalized Multi-Protocol Label Switching (GMPLS) Request for Comments (RFCs)—particularly RFCs 4426, 4872 and 4873—and Optical Internetworking Forum (OIF) signaling and routing implementation agreements (IAs).

Figure 16:
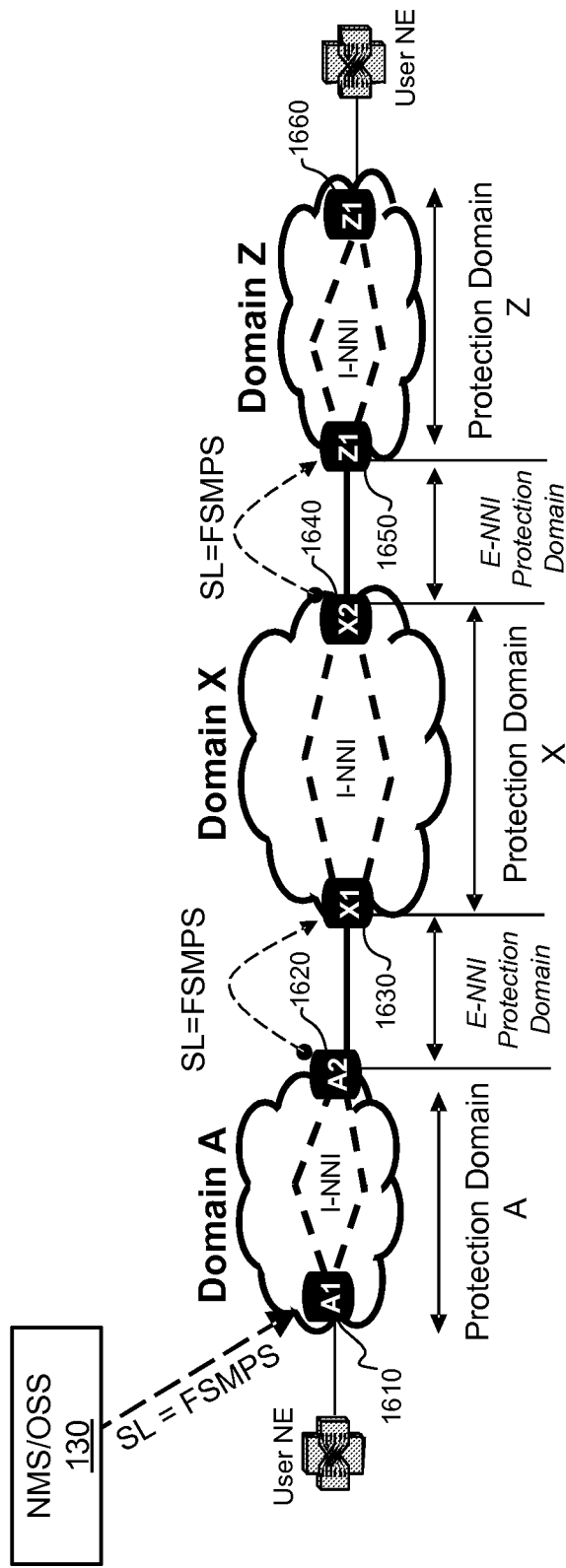
FIG. 16 is a diagram of an exemplary network showing how service level parameters can be used to instruct all P-domains in a network to trigger the FSMPS mechanism.

Referring now to FIG. 16, international standards, such as OIF UNI and E-NNI signaling standards, define a service level (SL) parameter to be used by a client device over UNI or E-NNIs to inform the source node or an ingress node of a P-domain what P&R feature should be used to provision the circuit within the P-domain. The SL parameter can be carried in path setup signaling messages between domains, so each down-stream domain will know what P&R scheme should be provisioned. For the case of FSMPS, the SL parameter may be assigned to an 8-bit integer of which all border nodes in all P-domains are made aware. FIG. 16 shows an example of how the SL parameter can be used to instruct all P-domains in a network to trigger the FSMPS mechanism within their respective P-domain. Specifically, NMS/OSS 130 may provide an SL parameter ("SL=FSMPS") to source node 1610 in P-domain A. A path setup signaling message including the parameter SL=FSMPS may be passed from border node 1620 to ingress node 1630 and from border node 1640 to ingress node 1650 to inform each domain what P&R feature should be used to provision a circuit within the respective P-domains.

Figure 17:
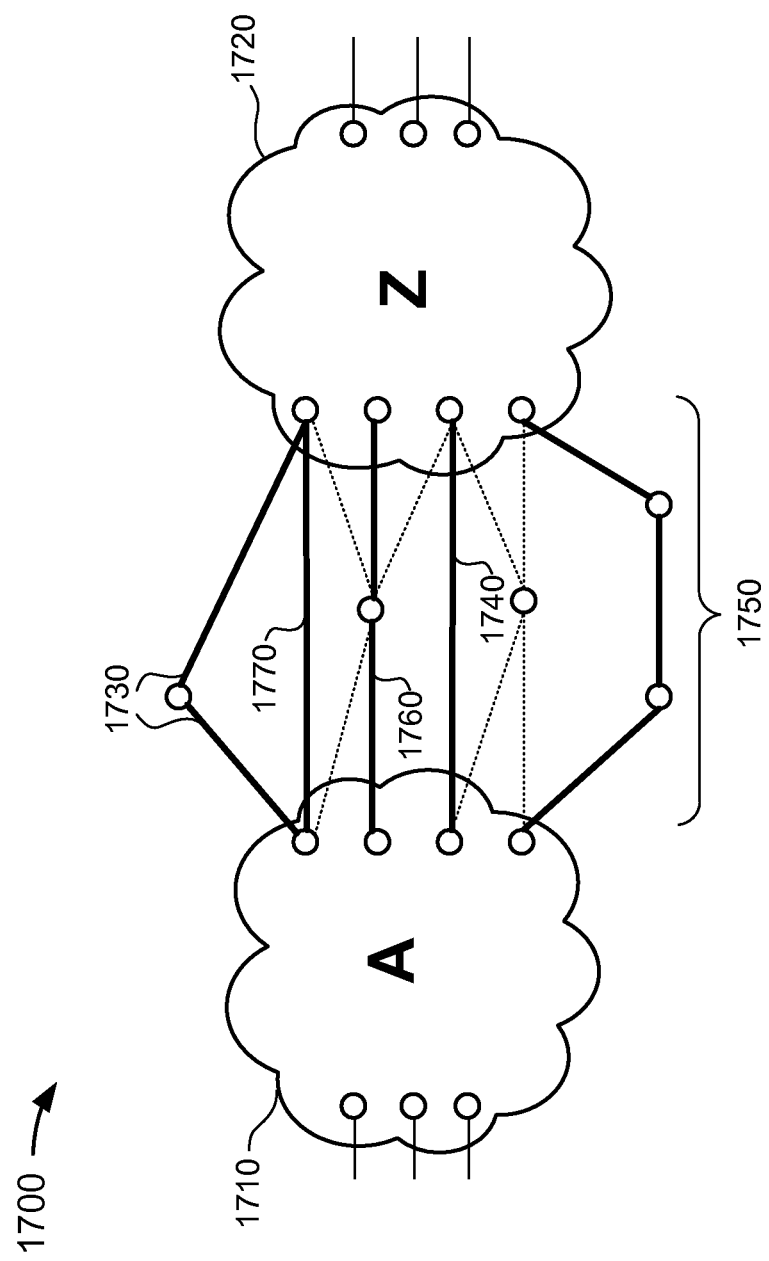
FIG. 17 is a diagram of an exemplary network implementing FSMPS.

FIG. 17 provides an example of an implementation of FSMPS. A service provider may decide to offer FSMPS between two major metro markets. The service provider may identify one point-of-presence in each market, such as an A-end 1710 in Market "A" and a Z-end 1720 in Market "Z." Based on a service forecast, the provider may pre-provision the first (primary) protection circuit 1730 between A and Z of certain bandwidth with desired protection type and may pre-select a set of prototype paths 1740, 1750, 1760 which are mutually disjoint at link and node levels. Furthermore, the selected prototype paths are also disjoint from the primary protection circuit 1730. Customers for the FSMPS may be allowed to order a range of circuit types. As an example, for SONET service, the circuit can be STS1, STS3c, STS12c, STS48c, etc.

For each customer order, the control plane may route the circuit using one of the pre-selected routes 1740, 1750, 1760. When the worst case protection bandwidth (WCPB) is exceeding X % of the primary protection circuit bandwidth, one secondary protection circuit 1770 will be added dynamically to the protection circuit group. When network faults occur, all affected customer FSMP circuits through any of routes 1740, 1750, 1760 will be restored using one or more of protection circuits 1730 and/or 1770. In one implementation, restoration after the first failure may be guaranteed. The number of restorations guaranteed for subsequent failures may be dependent upon the protection type provisioned for the protection circuits. When services are terminated and circuits are released, the WCPB can be recalculated. If the recalculated WCPB is less than Y % of total available protection bandwidth, one protection circuit 1730, 1770 can be released. Thus, the FSMPS can allow the number of customer circuits to grow in real-time and can dynamically adjust protection circuit capacity to meet customer traffic profile.

Implementations described herein may provide a flexible shared mesh protection service (FSMPS) for intelligent optical transport networks (IOTNs). In one exemplary embodiment, provided herein are a class of shared mesh protection service for TDM-based OTNs (e.g., SONET/SDH, G.709 OTN), an underlying networking mechanism required to support the service, and service actions to guide implementation of the service. The FSMPS may allow multiple client circuits between a source and a destination to share protection bandwidth, which can reduce bandwidth requirements for service protection.

Compared to traditional shared mesh protection schemes, the FSMPS provides greater flexibility in a number of ways. One way, for example, is that FSMPS may remove the restriction that client circuits (i.e., circuits subject to protection) and the shared protection circuit(s) be of the same circuit type. Another way is that the size of a service group in FSMPS can be adjusted dynamically, contrary to the statically-provisioned, fixed-size service group in traditional shared mesh applications. Using FSMPS, the number of client circuits and shared protection circuits can grow or reduce depending on the demands. FSMPS may also provide additional protection to the shared protection circuits to ensure client circuits can withstand multiple faults in sequence. Implementation and deployment of FSMPS can be segmented by control plane routing or vendor domain boundaries, allowing domains to implement the service in different ways. Also, FSMPS can be implemented to provide shared mesh protection on both path (intra-domain) and link (inter-domain) levels.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while series of blocks have been described with regard to the flowcharts of FIGS. 5C and 8-15, the order of the blocks may differ in other implementations. Further, non-dependent acts may be performed in parallel.

Implementations described herein may be implemented in methods and/or computer program products. Accordingly, implementations may be embodied in hardware and/or in software (including firmware, resident software, micro-code, etc.). Furthermore, implementations described herein may take the form of a computer program product on a computer-usable or computer-readable storage medium having computer-usable or computer-readable program code embodied in the medium for use by or in connection with an instruction execution system. The actual software code or specialized control hardware used to implement the systems and methods described herein is not limiting. Thus, the operation and behavior of the implementations were described without reference to the specific software code—it being understood that software and control hardware could be designed to achieve implementations based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A system comprising:
   one or more active/working circuit groups to transfer information through a protection domain,
      the protection domain defined by a plurality of network devices and a plurality of links connecting the plurality of network devices between a start point and an end point;
   a primary protection circuit through the protection domain,
      the primary protection circuit being disjoint from the one or more active/working circuit groups and providing shared protection for the one or more active/working circuit groups,
      the primary protection circuit being comprised of an individual protection circuit,
      a capacity of the primary protection circuit being dynamically adjusted when a protection bandwidth ratio is outside a predetermined threshold, and
      the protection bandwidth ratio being based on a total bandwidth of the one or more active/working circuit groups divided by a total available protection bandwidth of the primary protection circuit;
   a secondary protection circuit,
      the secondary protection circuit providing shared protection for the one or more active/working circuit groups, and
      the secondary protection circuit being used to restore one or more faults when a worst case protection bandwidth exceeds a particular threshold associated with the capacity of the primary protection circuit; and
   a processor to:
      receive a request to remove one of the primary protection circuit or the secondary protection circuit;
      designate one of the primary protection circuit or the secondary protection circuit for removal based on a comparison of respective bandwidths of the primary protection circuit and the secondary protection circuit;
      re-route each path associated with the designated one of the primary protection circuit or the secondary protection circuit,
         the processor, when re-routing each path, being to one of:
            re-route each path to the one of primary protection circuit or the secondary protection circuit that is not designated for removal, or
            re-route each path to another secondary protection circuit,
               the other secondary protection circuit being different than the secondary protection circuit; and
      update the protection bandwidth ratio for each of the one or more active/working circuit groups.

2. The system of claim 1, where the plurality of links supports at least one of:
   an external-network network interface (E-NNI); or
   an internal-network network interface (I-NNI).

3. The system of claim 1, where the secondary protection circuit is disjoint from the primary protection circuit.

4. The system of claim 1, where each of the one or more active/working circuit groups comprises a fully disjoint prototype path.

5. The system of claim 1, further comprising:
   a storage device to store a protection circuit group table with a registration of at least one of the primary protection circuit or the secondary protection circuit and a current status of at least one of the primary protection circuit or the secondary protection circuit.

6. The system of claim 5, where the storage device is further to store one or more of:
   an available bandwidth for protection in the primary protection circuit,
   a total available protection bandwidth of the primary protection circuit, or
   a protection type of the primary protection circuit.

7. The system of claim 1, further comprising:
   a storage device to store an active/working circuit group table with a registration of each of the one or more active/working circuit groups and a current status of each of the one or more active/working circuit groups.

8. The system of claim 1, where
   each active/working circuit group comprises one or more individual circuit segments, and
   an information stream from the one or more individual circuit segments of the one or more active/working circuit groups is automatically switched to at least one of the primary protection circuit or the secondary protection circuit in the event of a failure of the one or more individual circuit segments.

9. The system of claim 1, where at least two of the one or more active/working circuit groups, the primary protection circuit, or the secondary protection circuit are of different circuit types.

10. A method comprising:
    selecting, by one or more devices, one or more prototype paths over a protection domain within an optical transport network,
       the prototype paths defining an active/working circuit group;
    configuring, by the one or more devices, a primary protection circuit over the protection domain to provide shared protection for the active/working circuit group,
       the primary protection circuit being disjoint from the active/working circuit group;
    calculating, by the one or more devices, a protection bandwidth ratio based on a total available protection bandwidth of the primary protection circuit and a total bandwidth of the active/working circuit group;
    dynamically adjusting, by the one or more devices, a capacity of the primary protection circuit when the protection bandwidth ratio is outside a predetermined threshold;
    determining, by the one or more devices, whether the dynamically adjusted capacity of the primary protection circuit satisfies a worst case protection bandwidth threshold;
    adding, by the one or more devices and when the dynamically adjusted capacity of the primary protection circuit does not satisfy a worst case protection bandwidth threshold, a secondary protection circuit,
       the secondary protection circuit being to provide shared protection for the active/working circuit group;
    receiving a request to remove one of the primary protection circuit or the secondary protection circuit;
    designating one of the primary protection circuit or the secondary protection circuit for removal based on a comparison of respective bandwidths of the primary protection circuit and the secondary protection circuit;

re-routing each path associated with the designated one of the primary protection circuit or the secondary protection circuit,
the re-routing each path including one of:
re-routing each path to the one of primary protection circuit or the secondary protection circuit that is not designated for removal, or
re-routing each path to another secondary protection circuit,
the other secondary protection circuit being different than the secondary protection circuit; and
updating the protection bandwidth ratio for each of the one or more active/working circuit groups.

11. The method of claim 10, further comprising:
automatically switching an information stream from an individual circuit segment of the active/working circuit group to at least one of the primary protection circuit or the secondary protection circuit when a failure of the individual circuit segment is detected.

12. The method of claim 10, where the active/working circuit group and the protection circuit are of different types.

13. The method of claim 10, where an amount of prototype paths in the active/working circuit group is adjusted dynamically.

14. The method of claim 10,
where the secondary protection circuit is disjoint from the primary protection circuit.

15. The method of claim 10, where the protection domain includes an internal-network network interface (I-NNI) domain or an external-network network interface (E-NNI) domain.

16. The method of claim 10, where the protection domain includes at least one internal-network network interface (I-NNI) domain and at least one external-network network interface (E-NNI) domain.

17. The method of claim 10, further comprising:
creating an active/working circuit group table for each prototype path.

18. A system comprising:
a plurality of circuits;
a primary protection circuit;
a secondary protection circuit; and
a transport network, including a shared protection mechanism, that:
allows a quantity of circuits, of the plurality of circuits, between a particular start point and particular end point to increase in real-time,
dynamically adjusts a capacity of the primary protection circuit when a protection bandwidth ratio is outside a predetermined threshold, the protection bandwidth ratio being based on a total bandwidth of the number of circuits divided by a total available protection bandwidth of the primary protection circuit,
determines whether the dynamically adjusted capacity of the primary protection circuit satisfies a worst case protection bandwidth threshold;
adds, when the dynamically adjusted capacity of the primary protection circuit does not satisfy a worst case protection bandwidth threshold, the secondary protection circuit,
the secondary protection circuit being to provide shared protection for the active/working circuit group;
receives a request to remove one of the primary protection circuit or the secondary protection circuit;
designates one of the primary protection circuit or the secondary protection circuit for removal based on a comparison of respective bandwidths of the primary protection circuit and the secondary protection circuit;
re-routes each path associated with the designated one of the primary protection circuit or the secondary protection circuit,
the re-routing each path including to one of:
re-routing each path to the one of primary protection circuit or the secondary protection circuit that is not designated for removal, or
re-routing each path to another secondary protection circuit,
the other secondary protection circuit being different than the secondary protection circuit; and
updates the protection bandwidth ratio for each of the one or more active/working circuit groups.

19. The system of claim 18, where the transport network automatically switches an information stream to at least one of the primary protection circuit or the secondary protection circuit in the event of a failure of a circuit.

20. A system comprising:
one or more devices to:
select one or more prototype paths over a protection domain within an optical transport network, the one or more prototype paths defining an active/working circuit group;
select a primary protection circuit over the protection domain to provide shared protection for the active/working circuit group, the protection circuit being disjoint from the active/working circuit group;
dynamically adjust a capacity of the primary protection circuit when a protection bandwidth ratio is outside a predetermined threshold,
the protection bandwidth ratio being based on a total bandwidth of the active/working circuit group divided by a total available protection bandwidth of the primary protection circuit;
determine whether the dynamically adjusted capacity of the primary protection circuit satisfies a worst case protection bandwidth threshold;
add, when the dynamically adjusted capacity of the primary protection circuit does not satisfy a worst case protection bandwidth threshold, the secondary protection circuit,
the secondary protection circuit being to provide shared protection for the active/working circuit group;
receive a request to remove one of the primary protection circuit or the secondary protection circuit;
designate one of the primary protection circuit or the secondary protection circuit for removal based on a comparison of respective bandwidths of the primary protection circuit and the secondary protection circuit;
re-route each path associated with the designated one of the primary protection circuit or the secondary protection circuit,
the one or more devices, when re-routing each path, being to one of:
re-route each path to the one of primary protection circuit or the secondary protection circuit that is not designated for removal, or
re-route each path to another secondary protection circuit,
the other secondary protection circuit being different than the secondary protection circuit; and update the protection bandwidth ratio for each of the one or more active/working circuit groups.

* * * * *